United States Patent
Seo

(10) Patent No.: US 9,319,918 B2
(45) Date of Patent: Apr. 19, 2016

(54) METHOD IN WHICH A TERMINAL CONNECTED TO A CELLULAR NETWORK MEASURES A WIRELESS LAN AND RECEIVES INFORMATION FOR MEASUREMENT IN A WIRELESS ACCESS SYSTEM, AND TERMINAL OR BASE STATION DEVICE FOR SAME

(71) Applicant: LG ELECTRONICS INC., Seoul (KR)

(72) Inventor: Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 63 days.

(21) Appl. No.: 14/348,463

(22) PCT Filed: Sep. 28, 2012

(86) PCT No.: PCT/KR2012/007946
§ 371 (c)(1),
(2) Date: Mar. 28, 2014

(87) PCT Pub. No.: WO2013/048200
PCT Pub. Date: Apr. 4, 2013

(65) Prior Publication Data
US 2014/0247743 A1   Sep. 4, 2014

Related U.S. Application Data

(60) Provisional application No. 61/541,082, filed on Sep. 30, 2011.

(51) Int. Cl.
| H04L 1/00 | (2006.01) |
| H04W 24/10 | (2009.01) |
| H04W 56/00 | (2009.01) |
| H04W 48/16 | (2009.01) |

(52) U.S. Cl.
CPC .............. *H04W 24/10* (2013.01); *H04W 48/16* (2013.01); *H04W 56/001* (2013.01)

(58) Field of Classification Search
CPC .... H04W 24/10; H04W 56/001; H04W 48/16
See application file for complete search history.

(56) References Cited

U.S. PATENT DOCUMENTS

| 2010/0216474 A1 | 8/2010 | Park et al. |
| 2011/0158164 A1 | 6/2011 | Palanki et al. |

(Continued)

FOREIGN PATENT DOCUMENTS

| KR | 10-2009-0034261 A | 4/2009 |
| WO | WO 2011/088403 A1 | 7/2011 |

*Primary Examiner* — Clemence Han
(74) *Attorney, Agent, or Firm* — Birch, Stewart, Kolasch & Birch, LLP

(57) ABSTRACT

The present invention relates to a measurement method for the access of a terminal to a second base station in a wireless access system, and to a base station and terminal for the method. Provided is a measurement reporting method in a measurement method for the access of a first base station-based terminal to a second base station in a wireless access system, comprising the following steps: receiving information on the second base station from the first base station; measuring the second base station using the information on the second base station; and reporting the information obtained by the second base station measurement to the first base station, wherein the second base station measurement is performed on the basis of a reference signal transmitted by the second base station. A terminal device for the method is also provided.

16 Claims, 17 Drawing Sheets

(56) References Cited

U.S. PATENT DOCUMENTS

| | | | |
|---|---|---|---|
| 2012/0046030 A1* | 2/2012 | Siomina et al. | 455/423 |
| 2012/0083280 A1* | 4/2012 | Liu et al. | 455/446 |
| 2013/0258995 A1* | 10/2013 | Skov et al. | 370/329 |
| 2014/0219152 A1* | 8/2014 | Anto et al. | 370/311 |

* cited by examiner

FIG. 15

METHOD IN WHICH A TERMINAL CONNECTED TO A CELLULAR NETWORK MEASURES A WIRELESS LAN AND RECEIVES INFORMATION FOR MEASUREMENT IN A WIRELESS ACCESS SYSTEM, AND TERMINAL OR BASE STATION DEVICE FOR SAME

This application is the National Phase of PCT/KR2012/007946 filed on Sep. 28, 2012, which claims priority under 35 U.S.C. 19(e) to U.S. Provisional Application No. 61/541,082 filed on Sep. 30, 2011, all which are hereby expressly incorporated by reference into the present application.

TECHNICAL FIELD

The present invention relates to a wireless access system and, more particularly, to a method for measuring a wireless local area network (WLAN) by a user equipment connected to a cellular network, and an apparatus for supporting the same.

BACKGROUND ART

One of the most important requirements of a next generation wireless access system is to be able to support high data transmission rate. To this end, a variety of technologies including multiple input multiple output (MIMO), cooperative multipoint transmission (CoMP), and relays have been studied.

A legacy wireless access system has mainly considered only one carrier even though uplink bandwidth and downlink bandwidth are differently configured. For example, a wireless communication system in which one carrier is used for uplink and one carrier is used for downlink are one and bandwidth of uplink is generally symmetrical to bandwidth of downlink, based on a single carrier, has been provided.

Nonetheless, in consideration of saturated frequency resources, carrier aggregation (CA)/multiple cells for designing each of dispersed bandwidths to satisfy basic requirements capable of operating an independent system and for aggregating a plurality of bandwidths to one system has been introduced as a method for securing broad bandwidth in order to meet requirements for higher data transmission rate.

In this case, a carrier of a bandwidth unit available for an independent operation may be referred to as a component carrier (CC). To support increased transmission capacity, the bandwidth of a CC is extended to 20 MHz or more in a recent 3GPP long-term evolution-advanced (LTE-A) or 802.16m system. At this time, a broad bandwidth is supported by aggregating one or more CCs. For instance, if one CC supports a bandwidth of 5 MHz, 10 MHz, or 20 MHz, system bandwidth up to 100 MHz may be supported by aggregating a maximum of five CCs.

DETAILED DESCRIPTION OF THE INVENTION

Technical Problem

An object of the present invention is to provide a method for smoothly transmitting and receiving uplink/downlink data between a UE and an eNB in a wireless access system, preferably, in a wireless access system supporting CA, and an apparatus therefor.

Another object of the present invention is to provide a method for reducing the influence of interference which may occur between heterogeneous networks and managing signals when an additional secondary synchronization signal (SSS) is introduced to reduce interference between a primary synchronization signal (PSS) and the SSS in the heterogeneous networks, and an apparatus therefor.

It will be appreciated by persons skilled in the art that the objects that could be achieved with the present invention are not limited to what has been particularly described hereinabove and the above and other objects that the present invention achieves will be more clearly understood from the following detailed description.

Technical Solution

In an aspect of the present invention, provided herein is a method for performing measurement and reporting for access to a second base station by a user equipment based on a first base station in a wireless access system, including receiving information on the second base station from the first base station; measuring the second base station using the information on the second base station; and reporting measurement information for the second base station to the first base station, wherein the measuring is performed based on a reference signal transmitted by the second base station, and wherein the reference signal transmitted by the second base station corresponds to a reference signal of the first base station, and the first base station and the second base station are heterogeneous networks.

The first base station may be a cellular network base station and the second base station may be an access point (AP).

The information on the second base station may include at least one of a list of channel information, at least one access point (AP), a cell identity, the number of antenna ports, a transmission pattern of the reference signal, transmission bandwidth of the reference signal, transmission timing information of a beacon signal, and transmission period and offset information.

The transmission period and offset information of the reference signal may be exchanged between the first base station and the second base station through a backhaul link The method may further include receiving a cell-specific reference signal (CRS) pattern from the second base station, wherein an orthogonal frequency division multiplexing (OFDM) symbol on which a CRS is not transmitted is omitted in the CRS pattern.

The method may further include receiving measurement window information of a transmission timing of the reference signal from the first base station to adjust time synchronization between the first base station and the second base station, and performing measurement for the second base station according to the adjusted synchronization.

The method may further include transmitting, to the first base station, at least one of statistics of a channel state of the second base station, the number of contention stations, estimated throughput information, and channel recommendation information.

In another aspect of the present invention, provided herein is a method for receiving measurement information for a second base station by a first base station in a wireless access system, including transmitting activated information on the second base station to a user equipment based on the first base station in consideration of a location of the user equipment based on the first base station; and receiving measurement information for the second base station measured by the user equipment based on the first base station, using the information on the second base station, wherein the measurement information for the second base station is obtained based on a reference signal transmitted by the second base station, and wherein the reference signal transmitted by the second base station corresponds to a reference signal of the first base station and the first base station, and the second base station are heterogeneous networks.

The first base station may be a cellular network base station and the second base station may be an access point (AP).

The information on the second base station may include at least one of a list of channel information, at least one access point (AP), a cell identity, the number of antenna ports, a transmission pattern of the reference signal, transmission bandwidth of the reference signal, transmission timing information of a beacon signal, and transmission period or offset information.

The transmission period and offset information of the reference signal may be exchanged with the second base station through a backhaul link.

The method may further include receiving a cell-specific reference signal (CRS) pattern from the user equipment based on the first base station, wherein an orthogonal frequency division multiplexing (OFDM) symbol on which a CRS is not transmitted is omitted in the CRS pattern.

The method may further include transmitting measurement window information of a transmission timing of the reference signal to the user equipment based on the first base station to adjust time synchronization between the first base station and the second base station, and performing measurement for the second base station according to the adjusted synchronization.

The method may further include receiving, from the user equipment based on the first base station, at least one of statistics of a channel state of the second base station, the number of contention stations, estimated throughput information, and channel recommendation information.

In still another aspect of the present invention, provided herein is a user equipment based on a first base station, for performing measurement for access to a second base station in a wireless access system, the user equipment including a transmitter; a receiver; and a processor configured to control the transmitter and the receiver, control the receiver to receive information on the second base station from the first base station, measure the second base station using the information on the second base station, and control the transmitter to report measurement information for the second base station to the first base station, and wherein the measurement for the second base station is performed based on a reference signal transmitted by the second base station, and wherein the reference signal transmitted by the second base station corresponds to a reference signal of the first base station, and the first base station and the second base station are heterogeneous networks.

In a further another aspect of the present invention, provided herein is a first base station for receiving measurement information for a second base station in a wireless access system, including transmitter; receiver; and a processor configured to control the transmitter and the receiver, control the transmitter to transmit activated information on the second base station to a user equipment based on the first base station in consideration of a location of the user equipment based on the first base station and control the receiver to receive measurement information for the second base station measured by the user equipment based on the first base station, using the information on the second base station, and wherein the measurement information for the second base station is obtained based on a reference signal transmitted by the second base station, and wherein the reference signal transmitted by the second base station corresponds to a reference signal of the first base station and the first base station, and the second base station are heterogeneous networks.

Advantageous Effects

According to the embodiments of the present invention, uplink/downlink data can be smoothly transmitted and received between a UE and an eNB in a wireless access system, preferably, in a wireless access system supporting CA.

According to the embodiments of the present invention, synchronization can be efficiently obtained by transmitting an additional SSS in order to solve interference between a PSS and the SSS in heterogeneous networks.

According to the embodiments of the present invention, a UE can improve cell throughput and reduce the burden of implementation, due to mitigation of interference.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included as a part of the detailed description to provide a further understanding of the invention, provide embodiments of the invention and together with the description serve to explain the technical features of the invention.

FIG. 15 illustrates an example in which OFDM symbols on which no CRSs are transmitted are omitted.

BEST MODE FOR CARRYING OUT THE INVENTION

Figure 1:
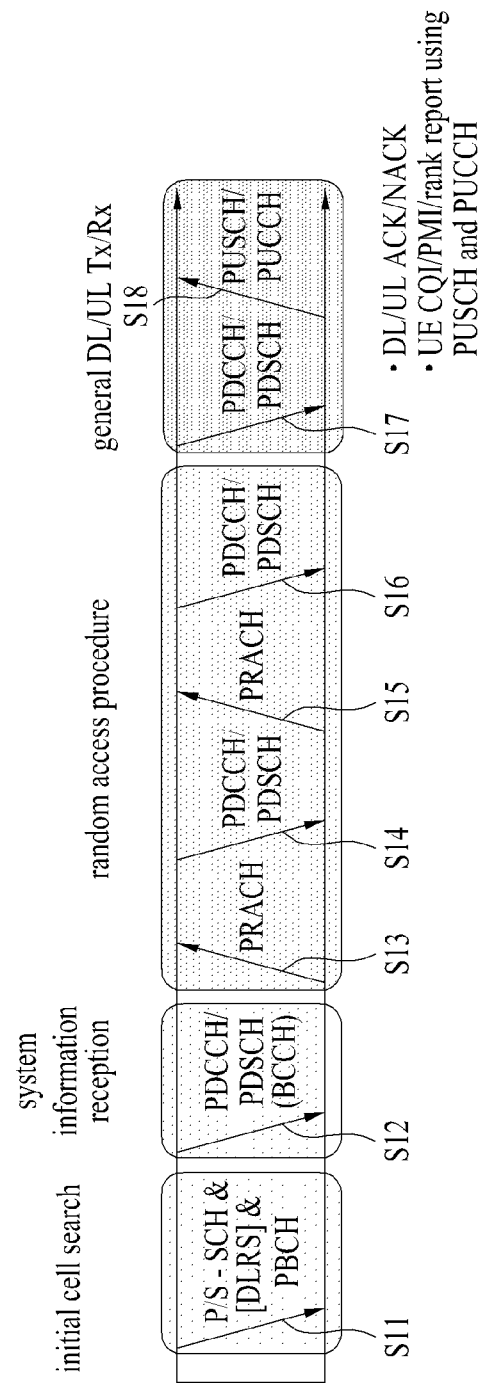
FIG. 1 is a diagram illustrating physical channels used in a 3GPP LTE system and a general signal transmission method using the same.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention.

In the embodiments of the present invention in this disclosure, a description is given of data transmission and reception between a base station (BS) and a terminal. Here, the BS refers to a terminal node of a network communicating directly with the terminal. In some cases, a specific operation described as being performed by the BS in this disclosure may be performed by an upper node of the BS. Namely, in a network comprised of a plurality of network nodes including the BS, various operations performed for communication with the terminal may be performed by the BS or network nodes other than the BS. The term "BS" may be replaced with the terms fixed station, Node B, eNode B (eNB), access point, etc. The term "relay" may be replaced with the terms relay node (RN), relay station (RS), etc. In addition, the term "terminal" may be replaced with the terms user equipment (UE), mobile station (MS), mobile subscriber station (MSS), subscriber station (SS), etc.

Specific terms used in the following description are provided to aid in understanding of the present invention and those terms may be changed without departing from the technical spirit of the present invention.

The embodiments of the present invention may be supported by documents disclosed in at least one of wireless access system standards including institute of electrical and electronics engineers (IEEE) 802, 3rd general partnership project (3GPP), 3GPP long term evolution (LTE) and LTE-advanced (LTE-A), and 3GPP2 system. That is, obvious steps or portions which are not described in the embodiments of the present invention may be supported by the above documents. In addition, all terms described in this disclosure may be explained by the above standard documents.

The following technology may be applied to a variety of wireless access systems using code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied as radio technology such as universal terrestrial radio access (UTRA) or CDMA2000. TDMA may be embodied as radio technology such as global system for mobile communications (GSM)/general packet radio service (GPRS)/enhanced data rates for GSM evolution (EDGE). OFDMA may be embodied with radio technology such as IEEE 802.11 (Wi-Fi), IEEE 802.16 (WiMAX), IEEE 802-20, and evolved UTRA (E-UTRA). UTRA is a part of a universal mobile telecommunications system (UMTS). 3rd generation partnership project (3GPP) long-term evolution (LTE) is part of evolved UMTS (E-UMTS), which uses E-UTRA. 3GPP LTE employs OFDMA in downlink and employs SC-FDMA in uplink. LTE-A is an evolved version of 3GPP LTE.

For clarity, the following description focuses on 3GPP LTE/LTE-A. However, technical features of the present invention are not limited thereto.

1. Overview of 3GPP LTE/LET-A System to which the Present Invention is Applicable 1.1. System Overview FIG. 1 is a diagram illustrating physical channels used in a 3GPP LTE system and a general signal transmission method using the same.

A UE performs initial cell search such as synchronization establishment with an eNB when the UE is powered on or enters a new cell in step S11. To this end, the UE may receive a primary synchronization channel (P-SCH) and a secondary synchronization channel (S-SCH) from the eNB, establish synchronization with the eNB, and acquire information such as a cell identity (ID).

Thereafter, the UE may receive a physical broadcast channel (PBCH) from the eNB to acquire information broadcast in the cell. Meanwhile, the UE may receive a DL reference signal (RS) in the initial cell search step to confirm a downlink channel state.

Upon completion of initial cell search, the UE may receive a physical downlink control channel (PDCCH) and a physical downlink shared channel (PDSCH) according to information included in the PDCCH to acquire more detailed system information in step S12.

Next, the UE may perform a random access procedure such as steps S13 to S16 to complete access to the eNB. To this end, the UE may transmit a preamble through a physical random access channel (PRACH) (S13) and receive a response message to the preamble through the PDCCH and the PDSCH corresponding to the PDCCH (S14). In the case of contention-based random access, a contention resolution procedure including transmission of a PRACH signal (S15) and reception of a PDCCH signal and a PDSCH signal corresponding to the PDCCH signal (S16) may be additionally performed.

The UE which has performed the above procedures may receive a PDCCH and/or PDSCH signal (step S17) and transmit a physical uplink shared channel (PUSCH) and/or physical uplink control channel (PUCCH) signal (step S18) according to a general UL/DL signal transmission procedure.

Control information that the UE transmits to the eNB is referred to as uplink control information (UCI). The UCI includes a hybrid automatic repeat and request (HARQ) acknowledgement (ACK)/negative ACK (NACK), a scheduling request (SR), a channel quality indicator (CQI), a precoding matrix index (PMI), a rank indicator (RI), etc.

In the LTE system, UCI is generally periodically transmitted on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
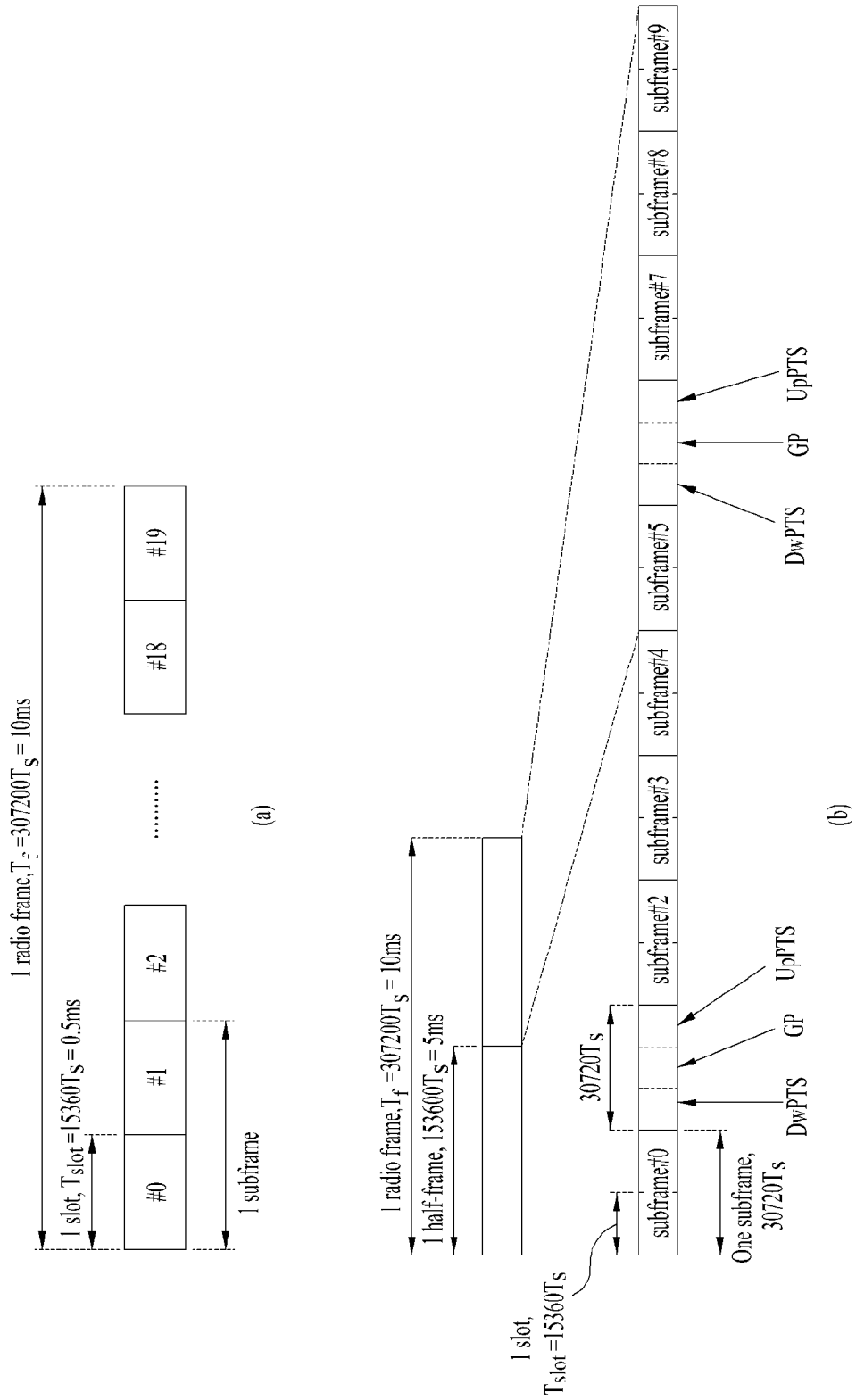
FIG. 2 illustrates the structure of a radio frame in a 3GPP LTE system.

FIG. 2 illustrates radio frame structures used in 3GPP LTE.

FIG. 2(a) illustrates frame structure type 1. Frame structure type 1 is applicable to both a full-duplex frequency division duplex (FDD) system and a half-duplex FDD system.

One radio frame is 10 ms ($T_f = 307200 \cdot T_S$) long, including 20 slots of equal size indexed from 0 to 19. Each slot is 0.5 ms ($T_{slot} = 15360 \cdot T_S$) long. One subframe includes two successive slots. An i-th subframe includes 2i-th and (2i+1)-th slots.

That is, a radio frame includes 10 subframes. A time required to transmit one subframe is defined as a transmission time interval (TTI). $T_S$ is a sampling time given as $T_S=1/(15 \text{ kHz}\times 2048)=3.2552\times 10^{-8}$ (about 33 ns). One slot includes a plurality of orthogonal frequency division multiplexing (OFDM) symbols or SC-FDMA symbols in the time domain and a plurality of resource blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full-duplex FDD system, 10 subframes may be used simultaneously for DL transmission and UL transmission during a 10-ms duration. UL transmission and DL transmission are distinguished by frequency. On the other hand, a UE cannot perform transmission and reception simultaneously in a half-duplex FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a time division duplex (TDD) system. One radio frame is 10 ms ($T_f=307200 \cdot T_S$) long, including two half-frames each having a length of 5 ms ($=153600 \cdot T_S$) long. Each half-frame includes five subframes each having 1 ms ($=30720 \cdot T_S$) long. An i-th subframe includes 2i-th and (2i+1)-th slots each having a length of 0.5 ms ($T_{slot}=15360 \cdot T_S$). $T_S$ is a sampling time given as $T_S=1/(15 \text{ kHz}\times 2048)=3.2552\times 10^{-8}$ (about 33 ns).

A type-2 frame includes a special subframe having three fields, a downlink pilot time slot (DwPTS), a guard period (GP), and an uplink pilot time slot (UpPTS). The DwPTS is used for initial cell search, synchronization, or channel estimation at a UE, and the UpPTS is used for channel estimation and UL transmission synchronization with a UE at an eNB. The GP is used to eliminate UL interference between UL and DL caused by multi-path delay of a DL signal.

Table 1 below lists special subframe configurations (DwPTS/GP/UpPTS lengths).

TABLE 1

| Special subframe configuration | Normal cyclic prefix in downlink | | | Extended cyclic prefix in downlink | | |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

UL-DL configurations for frame structure type 2 represent rules of allocating (or reserving) each subframe as a DL subframe or a UL subframe. Table 2 lists such UL-DL configurations.

TABLE 2

| Uplink-downlink configuration | Downlink-to-Uplink Switch-point periodicity | Subframe number | | | | | | | | | |
| | | 0 | 1 | 2 | 3 | 4 | 5 | 6 | 7 | 8 | 9 |
|---|---|---|---|---|---|---|---|---|---|---|---|
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 2, "D" represents a DL subframe, "U" represents a UL subframe, and "S" represents a special subframe including a DwPTS, a GP, and an UpPTS in a radio frame. 7 UL-DL configurations are available and differ in positions or numbers of DL subframes, special subframes, and UL subframes.

A time point at which DL switches to UL or UL switches to DL is called a switch point. Switch-point periodicity is a period in which switching between a UL subframe and a DL subframe is repeated in the same manner. The switch-point periodicity is 5 ms or 10 ms. If the switch-point periodicity is 5 ms, a special subframe S exists in every half-frame and if the switch-point periodicity is 10 ms, a special subframe S exists only in the first half-frame.

In every UL-DL configuration, subframe 0, subframe 5, and the DwPTS are used for DL transmission, and the UpPTS and the subframe following a special subframe are always used for UL transmission.

The UL-DL configurations are system information that may be known to both an eNB and UEs. Each time UL-DL configuration information is changed, the eNB may inform a UE of the change in the UL-DL allocation state of a radio frame to a UE by transmitting only the index of configuration information. The configuration information is a kind of downlink control information (DCI) and may be transmitted on a DL control channel, PDCCH, like other scheduling information. The configuration information may be broadcast to all UEs within a cell on a broadcast channel (BCH). The number of half-frames in a radio frame, the number of subframes in a half-frame, and DL-UL subframe combinations in the TDD system are purely exemplary.

Meanwhile, HARQ ACK/NACK transmitted to the UE on a PHICH in an i-th subframe in an FDD system is associated with a PUSCH signal that the UE transmits in an (i-4)-th subframe.

On the other hand, since a DL/UL subframe configuration in a TDD system is different per UL-DL configuration, PUSCH and PHICH transmission timings vary according to the UL-DL configuration and to a subframe index (or number).

In an LTE system, the UL/DL timing relationship between a PUSCH, a PDCCH preceding the PUSCH, and a PHICH on which a DL HARQ ACK/NACK corresponding to the PUSCH is transmitted is predetermined.

Figure 3:
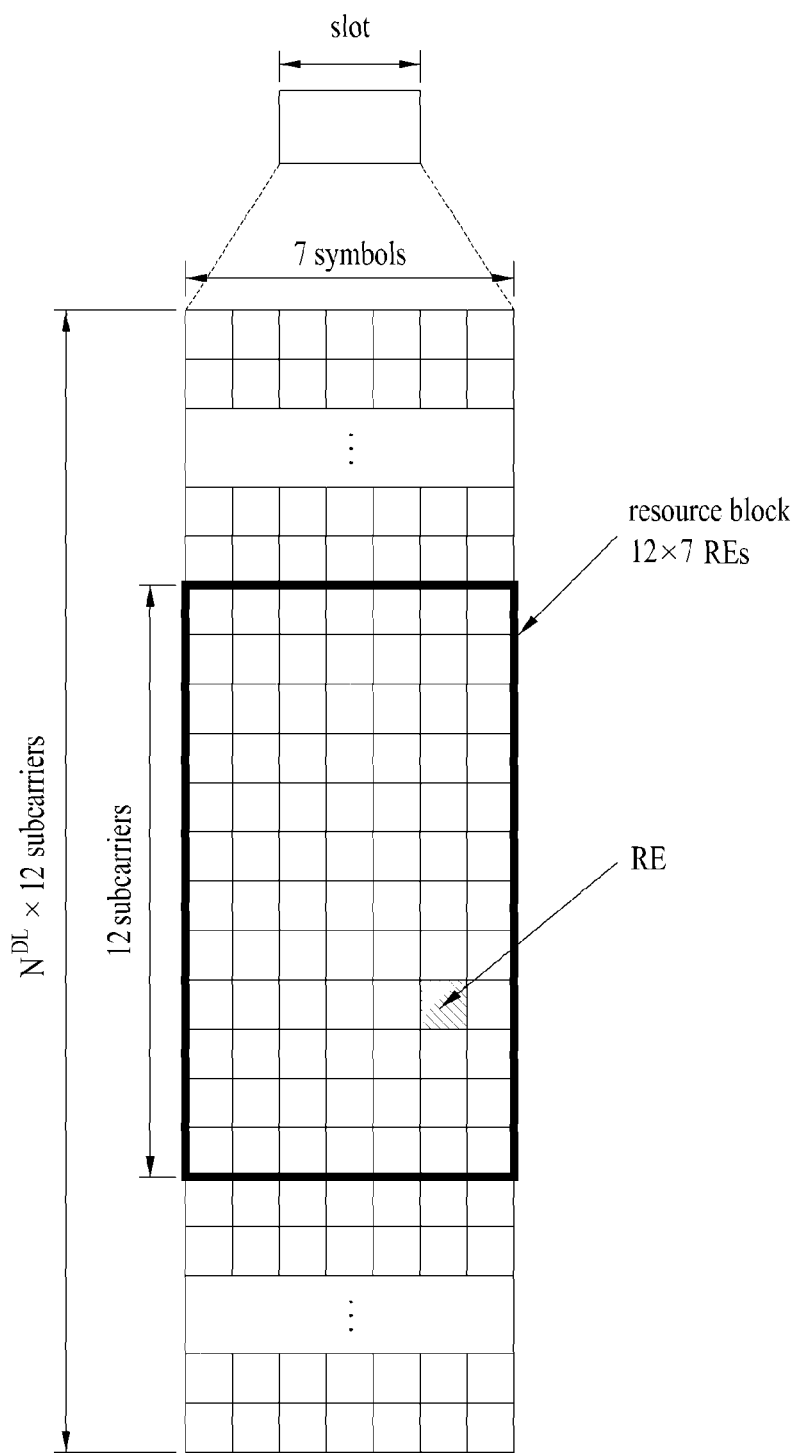
FIG. 3 illustrates a resource grid for a downlink slot.

FIG. 3 illustrates a resource grid for a DL slot.

Referring to FIG. 3, one DL slot includes a plurality of OFDM symbols in the time domain. One DL slot includes 7 OFDM symbols and an RB includes 12 subcarriers in the frequency domain, to which the present invention is not limited.

Each element of the resource grid is referred to as a resource element (RE). One RB includes 12×7 REs. The number of RBs in a DL slot, NDL, depends on a DL transmission bandwidth. A UL slot may have the same structure as a DL slot.

Figure 4:
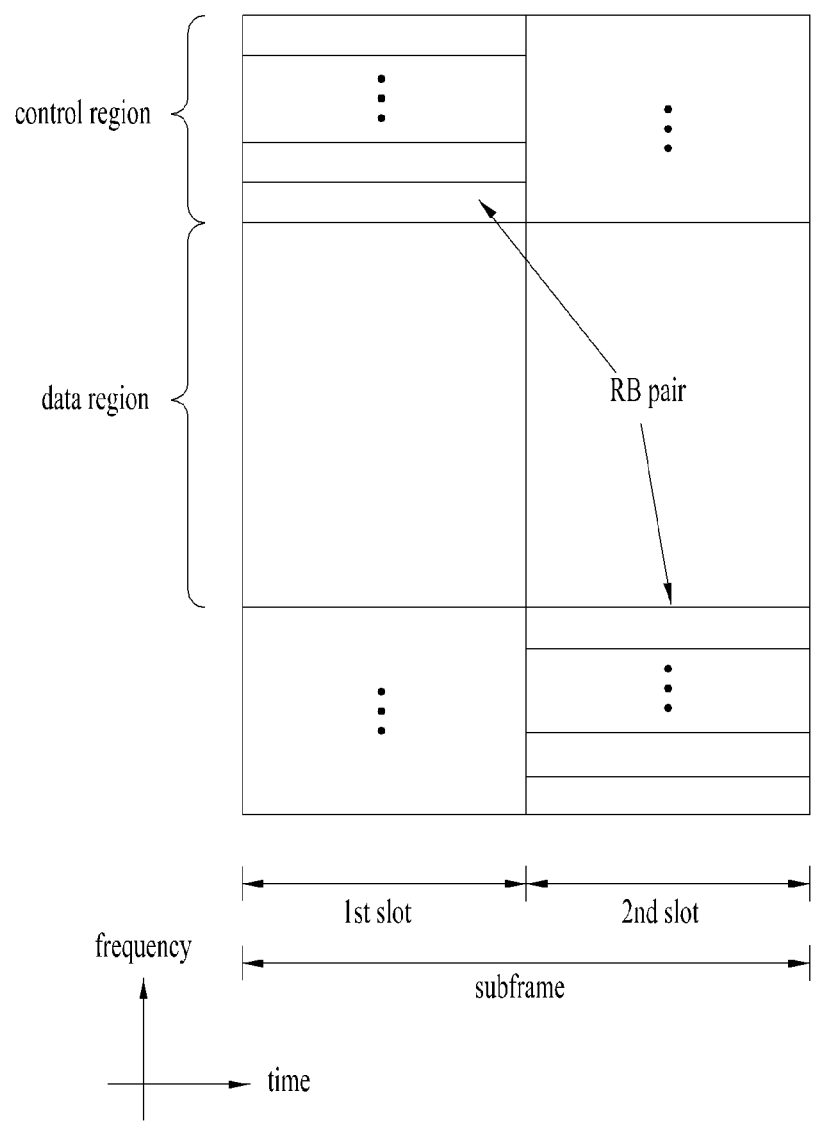
FIG. 4 illustrates the structure of an uplink subframe.

FIG. 4 illustrates the structure of a UL subframe.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe is allocated to a PUCCH for a UE. The RBs of the RB pair occupy different subcarriers in two slots. Thus it is said that the RB pair allocated to the PUCCH frequency-hops over a slot boundary.

Figure 5:
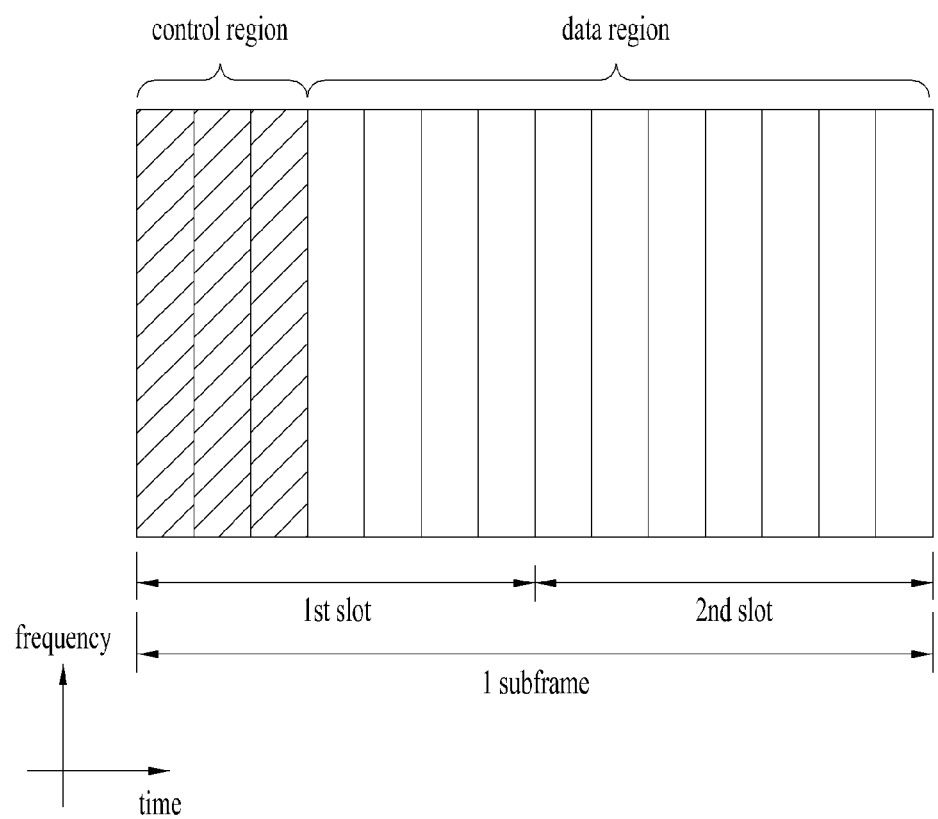
FIG. 5 illustrates the structure of a downlink subframe.

FIG. 5 illustrates the structure of a DL subframe.

Referring to FIG. 5, up to three OFDM symbols in the first slot in a DL subframe are used as a control region to which control channels are allocated and the other OFDM symbols of the DL subframe are used as a data region to which a PDSCH is allocated. DL control channels defined for the 3GPP LTE system include a physical control format indicator channel (PCFICH), a PDCCH, and a physical hybrid ARQ indicator channel (PHICH).

The PCFICH is transmitted in the first OFDM symbol of a subframe and carries information about the number of OFDM symbols used for transmission of control channels (i.e. the size of the control region) in the subframe. The PHICH is a response channel to UL transmission and carries a HARQ ACK/NACK signal. Control information transmitted on the PDCCH is called downlink control information (DCI). The DCI includes UL resource assignment information (UL grant), DL resource assignment information, or UL transmission (Tx) power control commands for a UE group.

1.2. Physical Downlink Control Channel (PDCCH)

1.2.1. PDCCH Overview

A PDCCH may deliver information about resource allocation and a transmission format for a downlink shared channel (DL-SCH) (i.e. a DL grant), information about resource allocation for an uplink shared channel (UL-SCH) (i.e. a UL grant), paging information of a paging channel (PCH), system information on the DL-SCH, information about resource allocation for a higher-layer control message such as a random access response transmitted on the PDSCH, a set of Tx power control commands for individual UEs of a UE group, voice over Internet protocol (VoIP) activation indication information, etc. A plurality of PDCCHs may be transmitted in the control region. A UE may monitor a plurality of PDCCHs. A PDCCH is composed of an aggregate of one or more consecutive control channel elements (CCEs). A PDCCH composed of one or more consecutive CCEs may be transmitted in the control region after subblock interleaving. A CCE is a logical allocation unit used to provide a PDCCH at a code rate based on the state of a radio channel. A CCE corresponds to a plurality of resource element groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be transmitted in the control region. A PDCCH is composed of an aggregate of one or more consecutive CCEs. A CCE is a unit of 9 REGs each including 4 REs. Four quadrature phase shift keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by $N_{REG}$. Then the number of CCEs available in the system is $N_{CCE}(=\lfloor N_{REG}/9 \rfloor)$ and the CCEs are indexed from 0 to $N_{CCE}-1$.

To simplify the decoding process of a UE, a PDCCH format including n CCEs may start with a CCE having an index equal to a multiple of n. That is, if a CCE index is i, the PDCCH format may start with a CCE satisfying i mod n=0

The eNB may configure one PDCCH signal with 1, 2, 4, or 8 CCEs. {1, 2, 4, 8} are called CCE aggregation levels. The number of CCEs used for transmission of a specific PDCCH is determined by the eNB according to channel state. For example, one CCE is sufficient for a PDCCH directed to a UE in a good DL channel state (a UE near the eNB). On the other hand, 8 CCEs may be required for a PDCCH directed to a UE in a poor DL channel state (a UE at a cell edge) in order to ensure sufficient robustness. Furthermore, the power level of the PDCCH may be adjusted to correspond to the channel state.

Table 3 illustrates PDCCH formats. 4 PDCCH formats are supported according to CCE aggregation levels as illustrated in Table 3.

TABLE 3

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or modulation and coding scheme (MCS) level of control information delivered in a PDCCH is different. An MCS level defines a code rate used for data coding and a modulation order. An adaptive MCS level is used for link adaptation. Generally, three or four MCS levels may be considered for control channels carrying control information.

Regarding the formats of control information, control information transmitted on a PDCCH is called DCI. The configuration of information carried in PDCCH payload may be changed depending on DCI format. The PDCCH payload is information bits. Table 4 lists DCI according to DCI formats.

TABLE 4

| DCI Format | Description |
| --- | --- |
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |

Referring to Table 4, the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of transmission power control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data on the PDSCH is related to a DCI format signaled through a PDCCH. The transmission mode may be configured semi-statically for the UE by higher-layer signaling (e.g. radio resource control (RRC) signaling). The transmission mode may be classified as single antenna transmission or multi-antenna transmission. A transmission mode is semi-statically configured for a UE by higher-layer signaling. For example, multi-antenna transmission includes transmit diversity, open-loop or closed-loop spatial multiplexing, multi-user multiple input multiple output (MU-MIMO), or beamforming. Transmit diversity increases transmission reliability by transmitting the same data through multiple Tx antennas. Spatial multiplexing enables high-speed data transmission without increasing system bandwidth by simultaneously transmitting different data through multiple Tx antennas. Beamforming is a technique for increasing the signal to interference plus noise ratio (SINR) of a signal by applying a weighting to multiple antennas according to channel state.

A DCI format depends on the transmission mode configured for the UE. The UE has a reference DCI format monitored according to the transmission mode configured for the UE. The following 7 transmission modes are available to UEs:

(1) Single antenna port: port 0
(2) Transmit diversity
(3) Open-loop spatial multiplexing
(4) Closed-loop spatial multiplexing
(5) MU-MIMO
(6) Closed-loop rank-1 precoding
(7) Single antenna port: port 5.

1.2.3 PDCCH Transmission

The eNB determines a PDCCH format according to DCI that will be transmitted to the UE and adds a cyclic redundancy check (CRC) to the control information. The CRC is masked by a unique ID (e.g. a radio network temporary identifier (RNTI)) according to the owner or usage of the PDCCH. If the PDCCH is destined for a specific UE, the CRC may be masked by a unique ID, e.g. a cell-RNTI (C-RNTI) of the UE. If the PDCCH carries a paging message, the CRC of the PDCCH may be masked by a paging indicator ID, e.g. a Paging-RNTI (P-RNTI). If the PDCCH carries system information, particularly, a system information block (SIB), the CRC of the PDCCH may be masked by a system information ID, e.g. a system information RNTI (SI-RNTI). To indicate that the PDCCH carries a random access response to a random access preamble transmitted by a UE, the CRC of the PDCCH may be masked by a random access-RNTI (RA-RNTI).

Then the eNB generates coded data by channel-encoding the CRC-added control information. Channel coding may be performed at a code rate corresponding to an MCS level. The eNB rate-matches the coded data according to a CCE aggregation level allocated to a PDCCH format and generates modulation symbols by modulating the coded data. In this case, a modulation order corresponding to the MCS level may be used for modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding

A plurality of PDCCHs may be transmitted in one subframe. That is, the control region of one subframe includes a plurality of CCEs, CCE 0 to CCE $N_{CCE,k}-1$. $N_{CCE,k}$ is the total number of CCEs in the control region of a k-th subframe. A UE monitors a plurality of PDCCHs in every subframe. Monitoring means that the UE attempts to decode each PDCCH according to a monitored PDCCH format. The eNB does not provide the UE with information about the position of a PDCCH directed to the UE in an allocated control region of a subframe. Since the UE has no knowledge of the position, CCE aggregation level, or DCI format of a PDCCH thereof, the UE searches for the PDCCH by monitoring a set of PDCCH candidates in the subframe in order to receive a control channel transmitted from the eNB. This is called blind decoding/detection. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a discontinuous reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive a PDCCH transmitted to the UE, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for the PDCCH, the UE should attempt detection with all possible CCE aggregation levels until the UE succeeds in blind decoding of the PDCCH.

In the LTE system, the concept of a search space (SS) is defined for blind decoding of a UE. An SS is a set of PDCCH candidates that the UE will monitor and may have a different size according to each PDCCH format. There are two types of SSs, common search space (CSS) and UE-specific/dedicated search space (USS). While all UEs may know the size of a CSS, a USS may be configured for each individual UE. Accordingly, a UE should monitor both a CSS and a USS to decode a PDCCH. As a consequence, the UE performs up to 44 blind decoding (BD) procedures per subframe, except for BD procedures based on different CRC values (e.g. C-RNTI, P-RNTI, SI-RNTI, and RA-RNTI).

With a small SS, the eNB may not secure CCE resources for transmitting PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

Table 5 illustrates the sizes of CSSs and USSs.

TABLE 5

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2, may be required for the UE.

The UE may search for DCI Format 1A and DCI Format 1C in a CSS. The UE may also be configured to search for DCI Format 3 or DCI Format 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An $SS_k^{(L)}$ is a PDCCH candidate set with a CCE aggregation level $L \in \{1,2,4,8\}$. The CCEs of PDCCH candidate set m in the SS may be determined by the following Equation 1.

$$L \cdot \{(Y_k+m) \bmod \lfloor N_{CCE,k}/L \rfloor\} + i \quad \text{[Equation 1]}$$

Here $M^{(L)}$ is the number of PDCCH candidates with CCE aggregation level L to be monitored in the SS, m=0, ..., $M^{(L)}$−1, is the index of a CCE in each PDCCH candidate, and i=0, ..., L−1, k=$\lfloor n_s/2 \rfloor$ whwere $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. Table 6 illustrates PDCCH candidates monitored by a UE.

TABLE 6

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Equation 1, for two aggregation levels, L=4 and L=8, $Y_k$ is set to 0 in the CSS, whereas $Y_k$ is defined by Equation 2 for aggregation level L in the USS.

$$Y_k = (A \cdot Y_{k-1}) \bmod D \quad \text{[Equation 2]}$$

Here and $Y_{-1} = n_{RNTI} \neq 0$ and $n_{RNTI}$ indicates an RNTI value, A=39827, and D=65537.

2. Carrier Aggregation (CA) Environment 2.1 CA Overview

A communication environment considered in the embodiments of the present invention includes all multicarrier support environments. That is, a multicarrier system or carrier aggregation (CA) system used in the present invention is a system using CA by aggregating one or more component carriers (CCs) each having a narrower bandwidth than a target bandwidth during configuration of a target broad bandwidth, in order to support a broad bandwidth.

In the present invention, multi-carrier means CA (or carrier combining). Herein, CA covers aggregation of contiguous carriers and aggregation of non-contiguous carriers. The number of aggregated CCs may be different for DL and UL. If the number of DL CCs is equal to the number of UL CCs, this is called symmetric aggregation. If the number of DL CCs is different from the number of UL CCs, this is called asymmetric aggregation. The term CA is interchangeable with the term carrier combining, bandwidth aggregation, spectrum aggregation, etc.

An LTE-A system is designed to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system. For example, the legacy 3GPP LTE system supports bandwidths of {1.4, 3, 5, 10, 15, and 20 MHz} and the 3GPP LTE-A system may support a broader bandwidth than 20 MHz using these LTE bandwidths for compatibility with the legacy system. A CA system of the present invention may support CA by defining a new bandwidth irrespective of the bandwidths used in the legacy system.

LTE-A adopts the concept of a cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources. If one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells is configured for the UE, a CA environment using more UL CCs than DL CCs may also be supported. That is, CA may be regarded as aggregation of two or more cells having different carrier frequencies (center frequencies). Herein, the term "cell" should be distinguished from a generally used "cell" as an area covered by an eNB.

Cells used in the LTE-A system include a primacy cell (PCell) and a secondary cell (SCell). A PCell and an SCell may be used as serving cells. For a UE in an RRC_CONNECTED state, if CA is not configured for the UE or the UE does not support CA, a single serving cell including only a PCell exists for the UE. On the contrary, if the UE is in the RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId, is an integer value ranging from 0 to 503. A short ID of an SCell, SCellIndex, used to identify an SCell is an integer value ranging from 1 to 7. A short ID of a serving cell (PCell or SCell), ServeCellIndex, is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may occur only in the PCell. In addition, the UE may use only the PCell in acquiring system information or changing a monitoring procedure. An evolved universal terrestrial radio access network (E-UTRAN) may change only a PCell for a handover procedure by a higher-layer RRC connection reconfiguration (RRCConnectionReconfiguraiton) message including mobility control information (mobilityControlInfo) to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment. When the E-UTRAN adds an SCell to a UE supporting CA, the E-UTRAN may transmit all system information related to operations of related cells in the RRC_CONNECTED state to the UE through dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than broadcasting in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. In the following embodiments, a primary CC (PCC) and a PCell may be used as the same meaning and a Secondary CC (SCC) and an SCell may be used as the same meaning.

3. CM Beamforming Scheme

In a current LTE standard, a MIMO transmission scheme is categorized into open-loop MIMO operated without channel information and closed-loop MIMO. According to the closed-loop MIMO scheme, a transmitter and a receiver perform beamforming based on channel information, i.e. CSI, in order to obtain multiplexing gain of MIMO antennas. To acquire CSI from a UE, an eNB commands the UE to feed back DL CSI by allocating a PUCCH or a PUSCH to the UE.

CSI is broadly divided into three types of information: a rank indicator (RI), a precoding matrix index (PMI), and a channel quality indicator (CQI). First, RI is information on channel rank, indicating the number of streams that the UE receives via the same time-frequency resource. Since RI is dominantly determined by long-term fading of a channel, RI is generally fed back from the UE to the eNB at a cycle longer than that of PMI or CQI. Second, PMI is a value reflecting a spatial characteristic of a channel and indicates a precoding matrix index of the eNB preferred by the UE based on a metric of signal-to-interference plus noise ratio (SINR). CQI is information indicating the strength of a channel and generally indicates a reception SINR obtainable when the eNB uses PMI.

An advanced communication system such as an LTE-A system considers additional multi-user diversity through multi-user MIMO (MU-MIMO). For this, higher accuracy is needed in terms of channel feedback. This is because, due to channel interference between UEs multiplexed in an antenna domain in MU-MIMO, accuracy of a feedback channel may significantly affect interference with other multiplexed UEs as well as a UE that reports feedback. Accordingly, the LTE-A standard has determined to separately design a final PMI as a long-term and/or wideband PMI, W1, and a short-term and/or subband PMI, W2, in order to raise accuracy of the feedback channel.

For example, a long-term covariance matrix of channels expressed as Equation 3 may be used for hierarchical codebook transformation that configures one final PMI from information of two channels.

$$W = \text{norm}(W1\,W2) \quad \text{[Equation 3]}$$

In Equation 3, W2 is a short-term PMI, which is a codeword of a codebook reflecting short-term channel information, W is a transformed codeword of a final codebook, and norm(A) is a matrix obtained by normalizing each column of matrix A to 1.

Conventionally, the codewords W1 and W2 are given as Equation 4.

$$W1(i) = \begin{bmatrix} X_i & 0 \\ 0 & X_i \end{bmatrix}, \text{ where } X_i \text{ is } Nt/2 \text{ by } M \text{ matrix.} \quad \text{[Equation 4]}$$

$$W2(j) = \overbrace{\begin{bmatrix} e_M^k & e_M^l & e_M^m \\ & \cdots & \\ \alpha_j e_M^k & \beta_j e_M^l & \gamma_j e_M^m \end{bmatrix}}^{r \text{ columns}} \text{ (if rank } = r\text{),}$$

where $1 \le k, l, m \le M$ and $k, l, m$ are integer.

The codewords are designed so as to reflect correlation characteristics between channels, if cross-polarized antennas are densely arranged (usually, the distance between adjacent antennas is equal to or less than half a signal wavelength). The cross-polarized antennas may be divided into a horizontal antenna group and a vertical antenna group and the two antenna groups are co-located, each having the property of a uniform linear array (ULA) antenna. Therefore, the correlation between antennas in each group has the same linear phase increment property and the correlation between the antenna groups is characterized by phase rotation. Since a codebook is obtained by quantizing values of channels, it is necessary to design a codebook reflecting channel characteristics corresponding to sources. For convenience of description, a rank-1 codeword designed in the above manner may be given by way of example and it can be confirmed that the channel characteristics are reflected in the codewords satisfying Equation 5.

$$W1(i) * W2(j) = \begin{bmatrix} X_i(k) \\ \alpha_j X_i(k) \end{bmatrix}$$ [Equation 5]

In Equation 5, a codeword is expressed as an $N_T \times 1$ vector (where $N_T$ is the number of Tx antennas) and the codeword is composed of an upper vector $x_i(k)$ and a lower vector $\alpha_j x_i(k)$, representing the correlation characteristics of the horizontal and vertical antenna groups, respectively. $x_i(k)$ is favorably expressed as a vector having the linear phase increment property, reflecting the correlation characteristics between antennas in each antenna group. For example, a discrete Fourier transform (DFT) matrix may be used for $x_i(k)$ For CoMP, higher channel accuracy is needed. In CoMP joint transmission (JT), since a plurality of eNBs cooperatively transmits the same data to a specific UE, CoMP JP may be theoretically regarded as a MIMO system in which antennas are geographically distributed. Namely, even when MU-MIMO is performed in JT, channel accuracy of a high level is needed to avoid interference between co-scheduled UEs as in single-cell MU-MIMO. In CoMP coordination beamforming (CB), accurate CSI is needed to avoid interference of neighboring cells with a serving cell.

3.1. Restricted RLM and RRM/CSI Measurement

Time-domain inter-cell interference coordination may be implemented as one interference coordination method. In time-domain inter-cell interference coordination, an aggressor cell uses a silent subframe (also called an almost blank subframe (ABS)), in which transmission power/activity of some physical channels is reduced (or zero power for the physical channels is configured), and a victim cell schedules a UE in consideration of power reduction of the aggressor cell. From the perspective of a victim cell UE, interference level significantly varies between subframes. To more accurately perform a radio link monitoring (RLM) operation or a radio resource management (RRM) including reference signal received power (RSRP)/reference signal received quality (RSRQ) measurement, or measure CSI for link adaptation in each subframe, the monitoring/measurement should be restricted to a set of subframes having uniform interference characteristics.

4. IEEE 802.11 System

Figure 6:
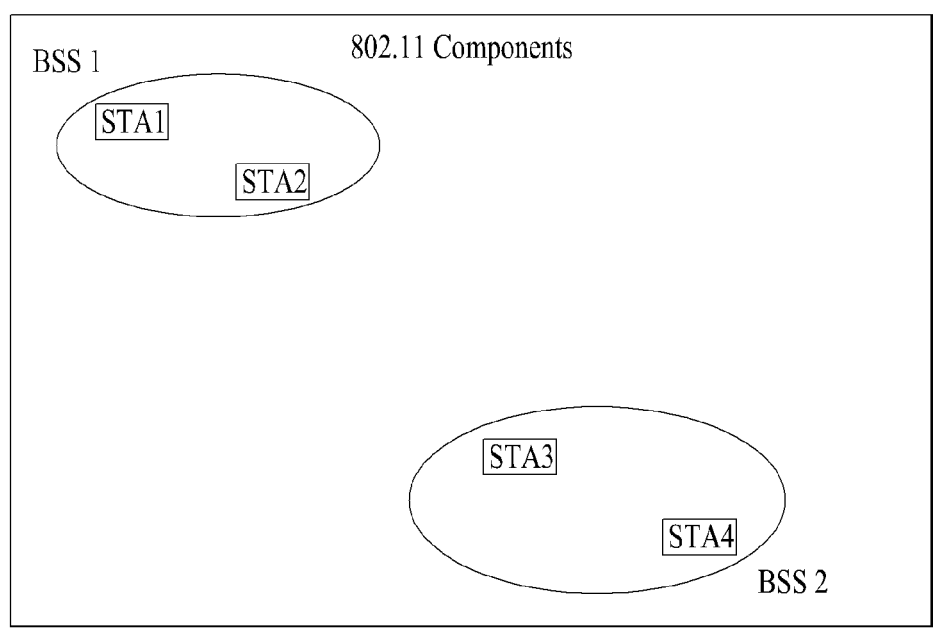
FIG. 6 is a diagram illustrating an exemplary architecture of an IEEE 802.11 system.

FIG. 6 is a diagram illustrating an exemplary architecture of an IEEE 802.11 system.

The architecture of the IEEE 802.11 system includes several components to provide a wireless local area network (WLAN) that transparently supports station (STA) mobility to higher layers. A basic service set (BSS) is a basic building block of an IEEE 802.11 LAN.

Referring to FIG. 6, two BSSs are shown and each BSS includes two STAs as members thereof. It is useful to consider ovals used to depict a BSS as a coverage area within which the member STAs of the BSS may remain in communication. (The concept of area, while not precise, is often good enough.) This area is called a basic service area (BSA). If an STA moves out of the BSA thereof, the STA can no longer directly communicate with other STAs present in the BSA.

An independent BSS (IBSS) is the most basic type of IEEE 802.11 LAN. A minimum IEEE 802.11 LAN may consist of only two STAs. Since the BSSs shown in FIG. 1 are simple and lack other components in contrast with FIG. 2, the two STAs can be taken to be representative of two IBSSs. This mode of operation is possible when IEEE 802.11 STAs are able to communicate directly. Because this type of IEEE 802.11 LAN is often formed without pre-planning, for only as long as the LAN is needed, this type of operation is often referred to as an ad hoc network.

A STA's membership in a BSS is dynamic (an STA may be turned on or off, come within a range, or go out of a range). To become a member of a BSS, a STA joins the BSS using a synchronization procedure. To access all the services of an infrastructure BSS, a STA should be associated. These associations are dynamic and involve the use of a distributed system service (DSS).

Figure 7:
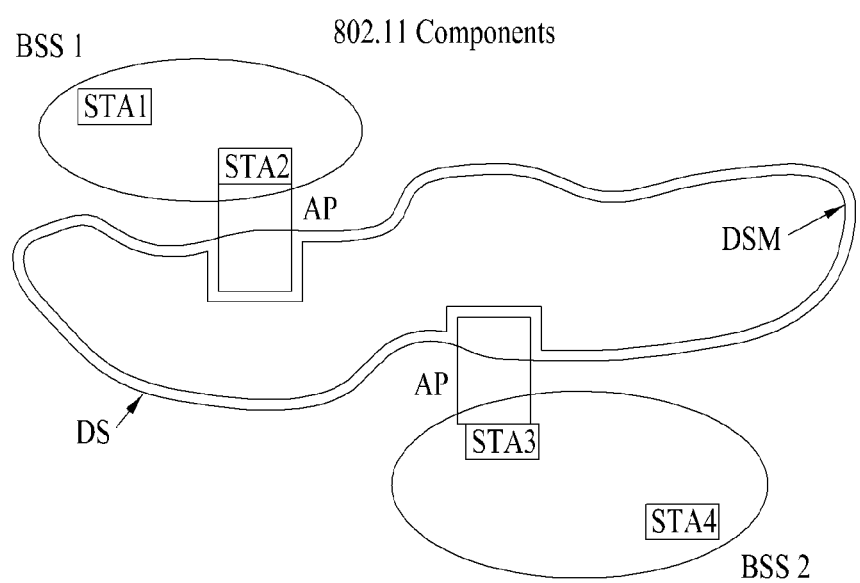
FIG. 7 illustrates another exemplary architecture of the IEEE 802.11 system in which DS, DSM, and AP components are added.

FIG. 7 illustrates another exemplary architecture of the IEEE 802.11 system in which distribution system (DS), distribution system medium (DSM), and access point (AP) components are added.

Physical limitations determine the direct station-to-station distance that may be supported. For some networks, this distance is sufficient; for other networks, increased coverage is required. Instead of existing independently, a BSS may also form a component of an extended form of a network that is composed of multiple BSSs. An architectural component used to interconnect BSSs is the DS.

IEEE standard 802.11 logically separates a wireless medium (WM) from the DSM. Each logical medium is used for different purposes, by a different component of the architecture. The definition of the IEEE standard 802.11 neither precludes nor demands that the multiple media be either the same or different.

Recognizing that the multiple media are logically different is the key to understanding the flexibility of the architecture. The IEEE 802.11 LAN architecture is specified independently of the physical characteristics of any specific implementation.

The DS enables mobile device support by providing logical services necessary to handle address to destination mapping and seamless integration of multiple BSSs.

The AP is any entity that has STA functionality and enables access to the DS, via a WM for associated STAs.

Data move between a BSS and the DS via an AP. All APs are also STAs. Accordingly, the APs are addressable entities. Addresses used by the APs for communication on the WM and on the DSM are not necessarily the same.

Data transmitted by one of STAs associated with the AP to an STA address of an AP are always received at an uncontrolled port for processing by an IEEE 802.1x port access entity. In addition, if a controlled port is authorized, these frames are conceptually transmitted to the DS.

Hereinafter, an extended service set (ESS) for a large coverage network will be explained.

Figure 8:
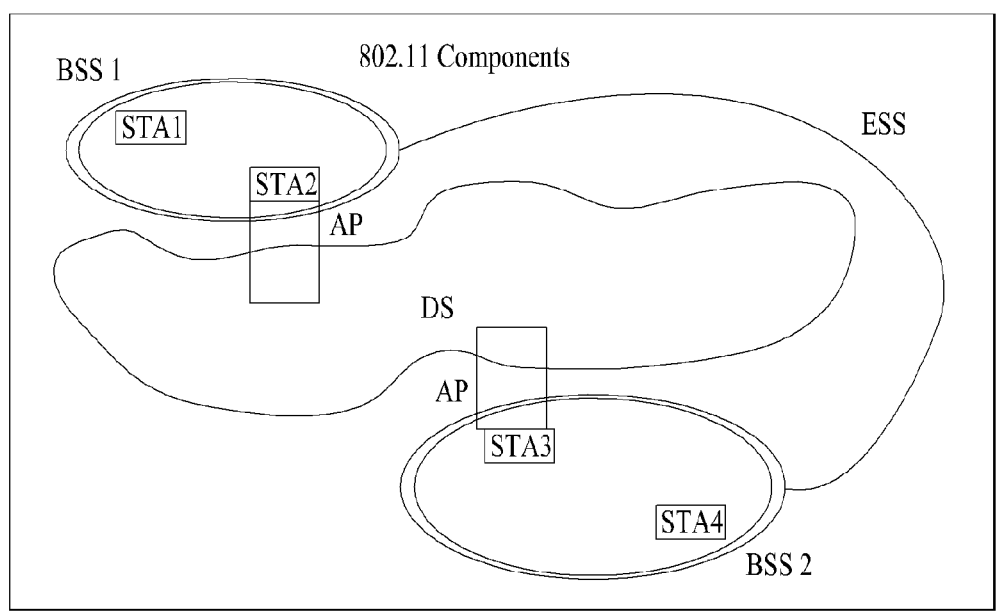
FIG. 8 illustrates another exemplary architecture of the IEEE 802.11 system for explaining the concept of an ESS.

FIG. 8 illustrates another exemplary architecture of the IEEE 802.11 system for explaining the concept of the ESS. IEEE standard 802.11 allows a DS and BSSs to form a wireless network of arbitrary size and complexity. The IEEE standard 802.11 refers to this type of network as as ESS network. An ESS is a union of the BSSs connected by the DS. The ESS does not include the DS. The key concept is that the ESS network appears an IBSS network for a logical link control (LLC) layer. STAs within an ESS may communicate and mobile STAs may move between BSSs (within the same ESS) transparently to the LLC layer.

Nothing is assumed by the IEEE standard 802.11 about physical locations of the BSSs in FIG. 8. All of the following are possible:

a) The BSSs may partially overlap. This is commonly used to arrange contiguous coverage within a physical volume.

b) The BSSs may be physically disjointed. Logically there is no limit to the distance between BSSs. The BSSs may be physically collocated.

c) The BSSs may be physically combined. This may be done to provide redundancy.

d) One or more IBSS or ESS networks may be physically present in the same space as one or more ESS networks. This may arise for a number of reasons. Some examples are when an ad hoc network is operating in a location that also has an ESS network, when physically overlapping IEEE 802.11 networks have been set up by different organizations, and when two or more different access and security policies are needed in the same location.

Figure 9:
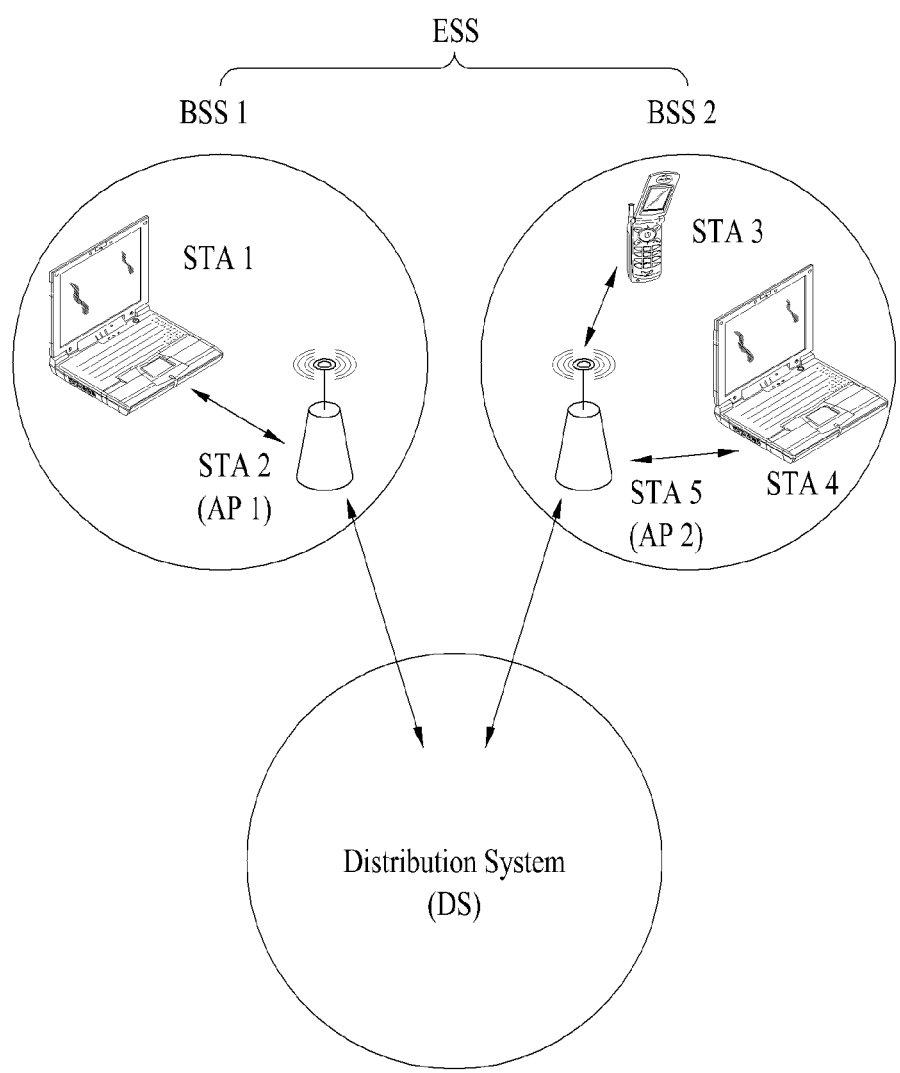
FIG. 9 illustrates an exemplary system architecture for better understanding a WLAN system.

FIG. 9 illustrates an exemplary infrastructure BSS including a DS. An ESS includes BSS 1 and BSS 2.

FIG. 4 illustrates an exemplary infrastructure BSS including a DS. An ESS includes BSS 1 and BSS 2. In the WLAN system, an STA is a device operating according to MAC/PHY regulation of IEEE 802.11 and includes an AP STA and a non-AP STA such a laptop computer, mobile phone, etc. Usually, the device which a user directly handles is a non-AP STA. Hereinafter, a non-AP STA may be variously referred to as a terminal, a wireless transmit/receive unit (WTRU), a user equipment (UE), a mobile station (MS), a mobile terminal, a mobile subscriber unit, etc. A non-AP STA capable of operation within a TV white space (TVWS) spectrum may be called a 'non-AR WS STA' or a 'WS STA'. An AP may correspond to a base station (BS), Node-B, a base transceiver system (BTS) or a femto BS in another field of wireless communication. An AP capable of operating in TVWS may be called a WS AP.

Based on the above understanding, an enablement mechanism configured such that an unlicensed STA operates in TVWS according to an aspect of the present invention will now be described.

For operation in TVWS, an unlicensed STA needs to acquire information about available channels in TVWS, unused by licensed STAs. As the most general approach to this end, it is defined that all unlicensed STAs sense whether main channels of the licensed devices are present in each channel of TVWS.

However, since this approach generates significant overhead, another approach scheme is that the unlicensed STAs use a regulatory database such as a TV band database including information about available channels for a WLAN operation at a specific geographic location. In the present invention, this approach scheme is preferred.

Furthermore, if all unlicensed STAs access the regulatory database in order to obtain the information about available channels, this is inefficient and leads to significant overhead. According to a proposed aspect of the present invention, unlicensed STAs are categorized into enabling STAs and dependent STAs. An enabling STA in TVWS may be defined as an STA that determines an available TV channel at a location thereof using geographical location identification and TV band database access capabilities thereof. A dependent STA in TVWS may be defined as an STA that receives available TV channel lists from an enabling STA or from a dependent AP that enables the operation of the enabling STA. According to the present invention, the enabling STA may serve to allow the dependent STA to operate in available channels of TVWS. That is, the enabling STA functions to enable the dependent STA. This enabling process is called dynamic station enablement (DSE).

Figure 10:
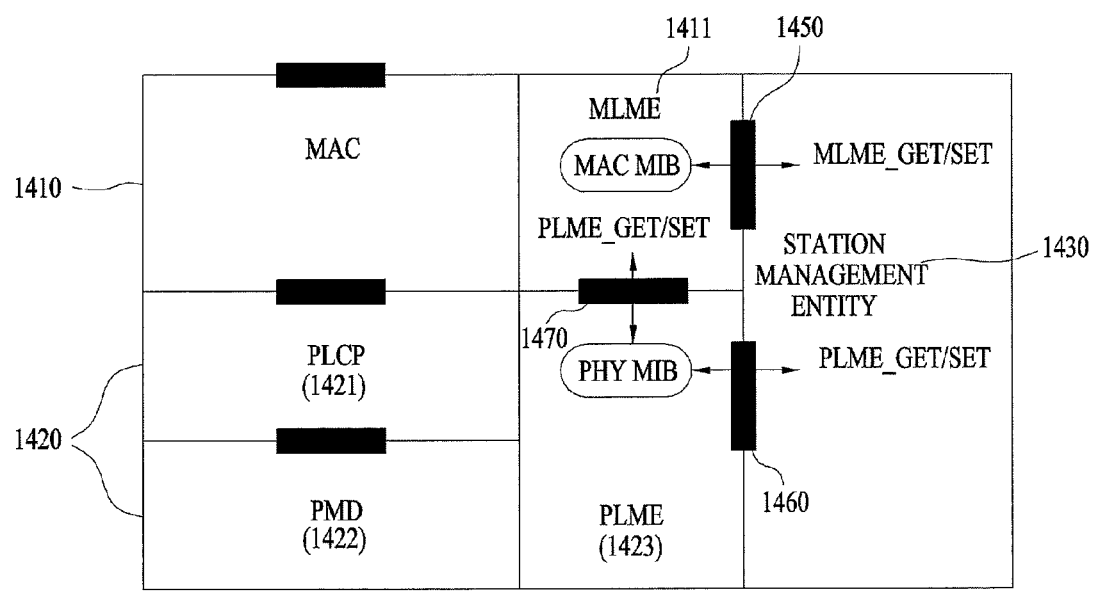
FIG. 10 illustrates an exemplary structure of a processor of an STA according to one embodiment of the present invention.

FIG. 10 illustrates an exemplary structure of a processor of an STA according to one embodiment of the present invention.

Processors may have multiple layer structures and FIG. 10 especially focuses on a MAC sublayer 1410 on a data link layer (DLL) and a physical layer 1420.

Referring to FIG. 710, a physical layer 1420 may include a physical layer convergence procedure (PLCP) entity 1421 and a physical medium dependent (PMD) entity 1422. The MAC sublayer 1410 and the physical layer 1420 conceptually include management entities called a MAC sublayer management entity (MLME) 1411 and a physical layer management entity (PLME) 1423, respectively. These entities 1411 and 1423 provide layer management service interfaces having layer management functions.

In order to provide correct MAC operation, a station management entity (SME) 1430 is present within each STA. The SME 1430 is a layer independent entity that can be viewed as residing in a separate management plane or as residing off to the side. The exact functions of the SME 1430 are not specified in this document but in general the SME 1430 can be viewed as being responsible for such functions as gathering of layer-dependent status from the various layer management entities (LMEs) and similarly setting the value of layer-specific parameters. The SME 1430 typically performs such functions on behalf of general system management entities and implements standard management protocols.

Various entities within FIG. 10 interact in various ways. FIG. 10 shows some examples of exchanging GET/SET primitives. XX-GET.request primitive is used for requesting the value of a given management information base (MIB) attribute. XX-GET.confirm primitive is used for returning an appropriate MIB attribute value if status="success," and otherwise returning an error indication in a status field. XX-SET.request primitive is used for requesting that the indicated MIB attribute be set to a given value. If the MIB attribute implies a specific action, it is requested that the action be performed. XX-SET.confirm primitive is used such that, if status="success," this confirms that the indicated MIB attribute has been set to a requested value and otherwise XX-SET.confirm primitive returns an error condition in the status field. If this MIB attribute implies a specific action, then this confirms that the action has been performed.

Referring to FIG. 10, the MLME 1411 and the SME 1430 may exchange various MLME_GET/SET primitives via MLME_SAP 1450. According to an example of the present invention, the SME 1430 may transmit MLME_WSM.request primitive to the MLME 1411 to request the MLME 1411 to transmit a white space map (WSM) broadcast frame to other STAs. As another example, the MLME 1411 may transmit, to the SME 1430, MLME-WSM.indication primitive indicating receipt of the WSM broadcast frame from other STAs.

As shown in FIG. 10, various PLCM_GET/SET primitives may be exchanged between the PLME 1423 and the SME 1430 via a PLME_SAP 1460 and between the MLME 1411 and the PLME 1423 via an MLME-PLME_SAP 1470.

The WSM element of an embodiment of the present invention may be transmitted by sequential procedures of the MAC 1410 and the physical layer 1420. In addition, the WSM element of an embodiment of the present invention may be received by sequential procedures of the MAC layer 1410 and the physical layer 1420. The detailed description of the preferred embodiments of the present invention has been given to enable those skilled in the art to implement and practice the invention. Those skilled in the art will appreciate that the present invention may be carried out in other specific ways than those set forth herein without departing from the essential characteristics of the present invention.

5. WLAN Access of UE of Cellular Network

The present invention proposes a method for effectively measuring a WLAN and reporting a measurement result through a cellular network, when a UE that has accessed the cellular network desires to access the WLAN for the purpose of data offloading. In the present invention, a 3GPP LTE system is assumed as an example of the cellular network and an IEEE 802.11 system is assumed as an example of the WLAN.

Figure 11:
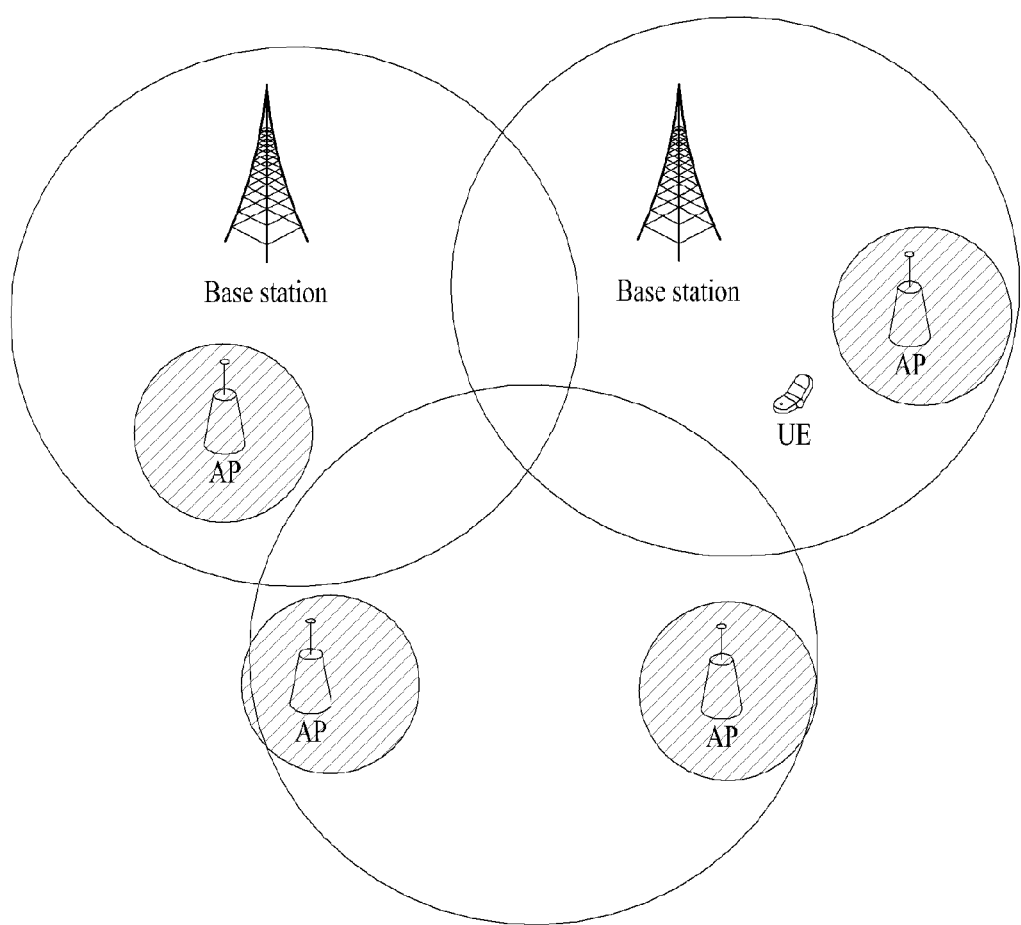
FIG. 11 illustrates a communication environment of a UE according to BSs and APs in accordance with an embodiment of the present invention.

FIG. 11 illustrates a communication environment of a UE according to BSs and APs in accordance with an embodiment of the present invention.

First, a wireless communication network considered in the present invention is illustrated in FIG. 11. That is, under the state in which a cellular network is established using a licensed spectrum only for a specific user, a WLAN system using an unlicensed spectrum only for a specific user, i.e. a licensed spectrum for all users, is also established for data offloading of the cellular network. Generally, the cellular network is installed for the purpose of providing a seamless service in an area of a wide range, whereas the WLAN system is selectively installed only in an area in which data is concentrated. Accordingly, it is desirable that the cellular network be mainly managed to rapidly access traffic of a low data rate, whereas the WLAN process traffic of a high data rate with a slow access speed in order to minimize a resource consumed for network management (e.g. a battery of a UE consumed for network measurement).

5.1. WLAN Measurement Using RS of Cellular Network

Figure 12:
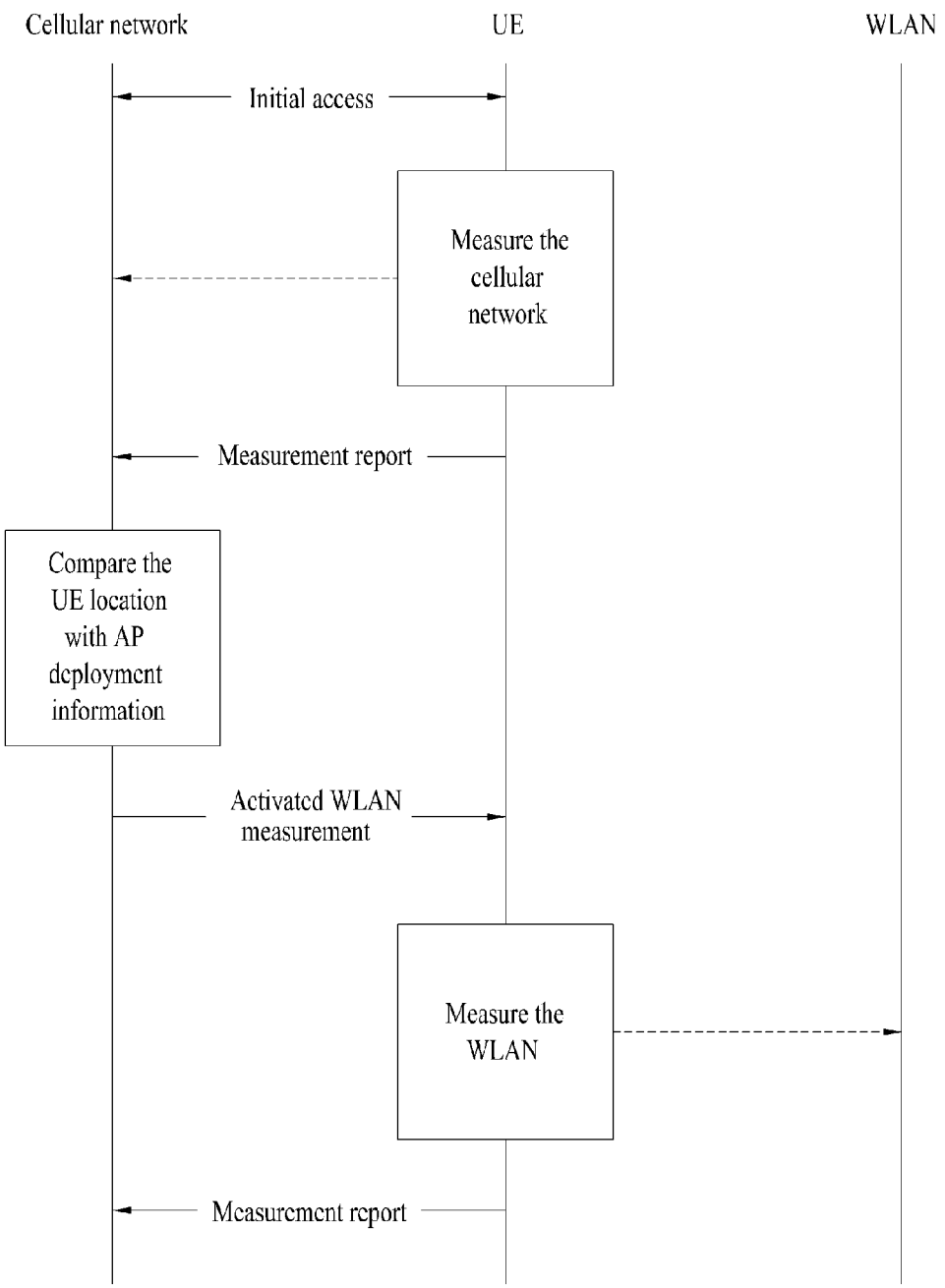
FIG. 12 illustrates a transmission/reception process of a UE to/from a BS and an AP in accordance with an embodiment of the present invention.

FIG. 12 illustrates a transmission/reception process of a UE to/from a BS and an AP in accordance with an embodiment of the present invention.

When a situation in which an access speed is adjusted to be slow in order to minimize a consumed resource is considered, a desirable operation proposed in the present invention is that a UE, in a cellular network, frequently updates location information thereof by performing a mobility management procedure such as measurement/reporting while persistently accessing the cellular network so that time to initiate a service sensitive to a time delay such as a voice call is reduced, and the UE, in a WLAN, performs measurement only when high rate traffic occurs with respect thereto and when an accessible WLAN AP is present in the vicinity thereof so that a battery consumed for management of the WLAN is saved. In this case, since the cellular network can be aware of approximate location information of the UE through measurement reporting of the UE, the network may determine whether an accessible AP is located near the UE by comparing AP deployment information with the location information of the UE. If it is determined that a specific UE is present in a location at which the WLAN can be measured, the network may command the UE to measure the neighboring AP as illustrated in FIG. 12. In a 3GPP LTE system, this measurement includes RSRP or RSRQ measurement for a serving cell and neighboring cells.

To aid the UE in measuring the WLAN, the cellular network may transmit information about a WLAN AP for measurement to the UE through the cellular network. This information may include a list of APs for which measurement is to be performed by the UE, channel information, and transmission timing information (a period or an offset) of a beacon signal.

Since various measurement and mobility management procedures in performing the above-described operations are performed in the cellular system, effective measurement can be performed if measurement in the WLAN is compatible with that in the cellular system. As a method for gaining this advantage, the present invention proposes that the WLAN AP transmit an RS of the cellular network, for effective measurement of a UE connected to the cellular network. The RS includes, for example, a cell-specific RS (CRS) or a channel state information (CSI)-RS of the 3GPP LTE system. The cellular network may transmit information about the CRS or CSI-RS (e.g. a cell ID, the number of antenna ports, an RS transmission pattern, RS transmission bandwidth, a transmission period and offset, etc.) to be used by each AP together with the list of WLAN APs while activating measurement for the WLAN. Through this operation, a cellular network UE may perform measurement for the WLAN while reusing an existing RS detection circuit. Meanwhile, the RS of the cellular network transmitted by the AP is viewed as a signal incapable of being recognized by a legacy WLAN STA, it is desirable to keep a transmission period of the RS as long as possible. To this end, a cellular BS and a WLAN AP may exchange information about transmission of the RS of the cellular network through a backhaul link. This information may include information about the period and offset of the RS of the cellular network transmitted by the WLAN AP and may be expressed as a time unit of the cellular network (e.g. as the unit of a subframe or frame of the 3GPP LTE system).

5.2. Subframes of Cellular Network and WLAN

Figure 13:
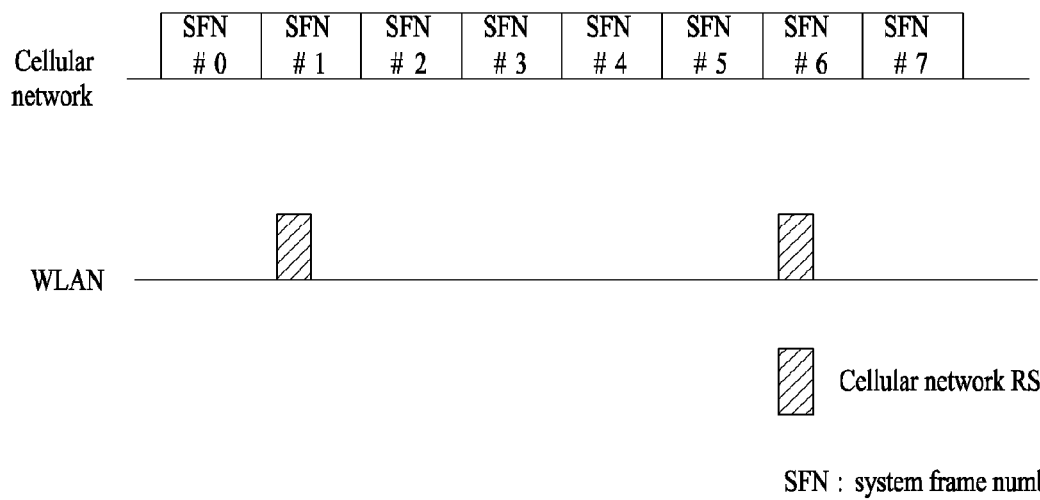
FIG. 13 illustrates a transmission subframe of a cellular network and a WLAN.

FIG. 13 illustrates a subframe of a cellular network and an RS transmission subframe of a WLAN in accordance with the present invention.

Referring to FIG. 13, it is assumed that a cellular BS and a WLAN AP are in synchronization (based on a subframe or a radio frame) and information indicating when or at which period an RS is transmitted based on a time of the cellular BS is exchanged between the cellular BS and the WLAN AP. In FIG. 13, an RS transmission period is five radio frames and an RS transmission offset is one radio frame. In the operation illustrated in FIG. 13, the RS used by the UE to measure the WLAN includes a specific signal (e.g. a beacon signal) of the WLAN.

5.3. Transmission Pattern of CRS

Figure 14:
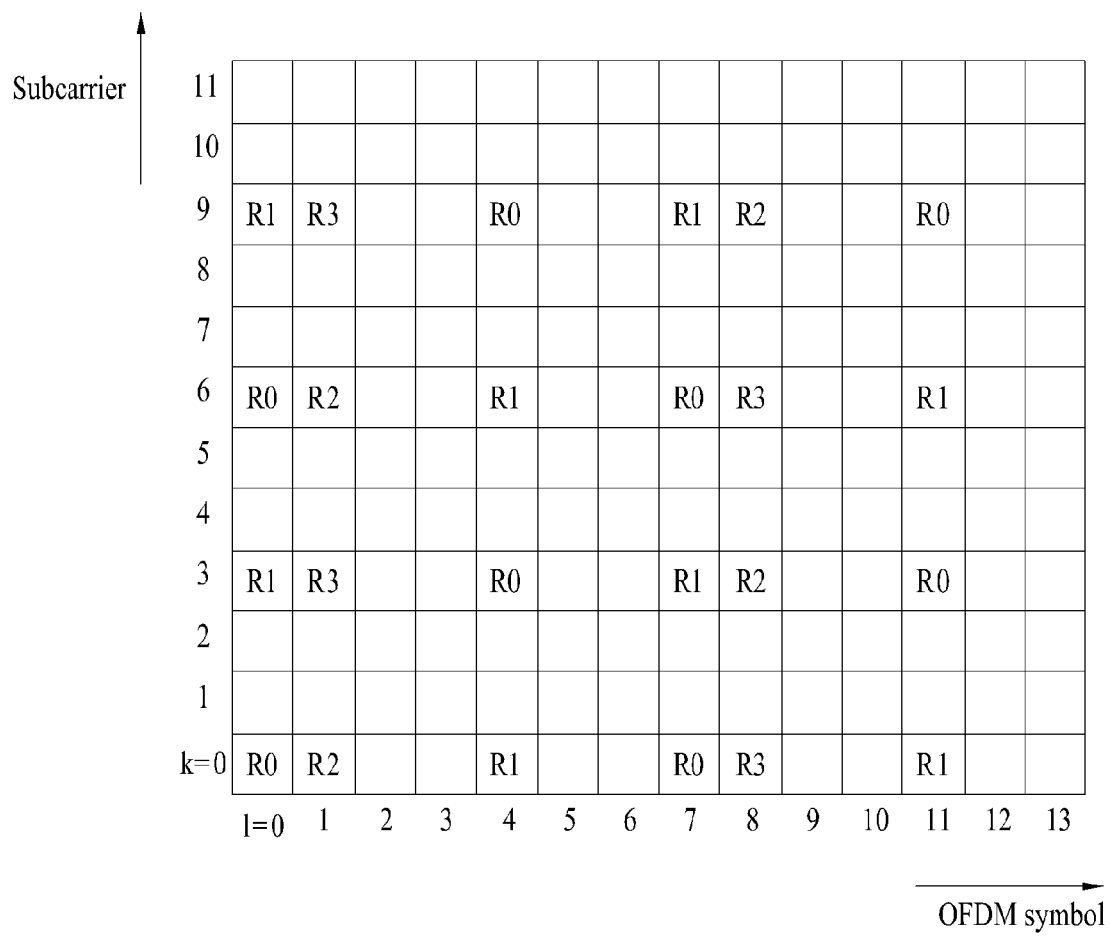
FIG. 14 illustrates an exemplary transmission pattern of a CRS of an LTE system.

FIG. 14 illustrates REs showing an exemplary CRS transmission pattern of an LTE system.

Referring to FIG. 14, Rn indicates a CRS RE of an n-th antenna port. Since the CRS transmission pattern illustrated in FIG. 14 considers the case in which both a CRS and data are scheduled, the data may be transmitted on REs on which CRSs are not transmitted and no CRSs may be transmitted on some OFDM symbols.

On the other hand, in the case illustrated in FIG. 13, since CRSs are simply used only for measurement, no data is transmitted. Accordingly, the AP may omit transmission of OFDM symbols on which CRSs are not transmitted to reduce time taken by the RS of the cellular network.

Figure 15:
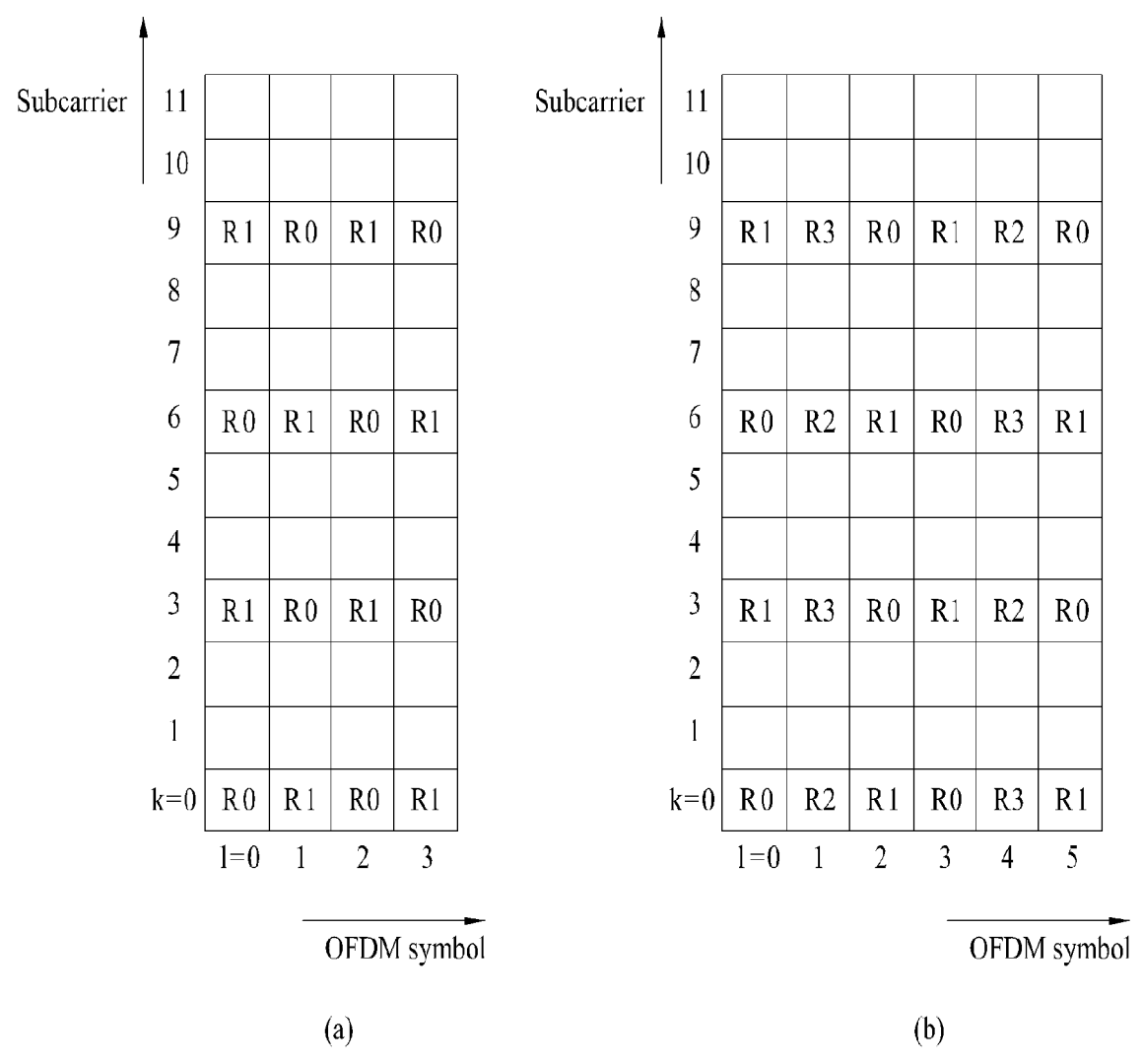

FIG. 15 illustrates an example in which OFDM symbols on which no CRSs are transmitted are omitted. FIG. 15(a) illustrates transmission of one CRS pattern on a total of four symbols by omitting symbols on which CRSs are not transmitted while transmitting CRSs through two ports. According to circumstance, an AP may transmit only CRSs for one port (e.g. R0). FIG. 15(b) illustrates transmission of one CRS pattern on a total of six symbols while transmitting CRSs through four ports. The CRSs may be transmitted only in a partial frequency region of an entire frequency bandwidth transmitted by the AP. This characteristic is effective when an operation bandwidth of a cellular network is not equal to that of a WLAN. As an example, the AP may transmit CRSs using a bandwidth corresponding to a minimum bandwidth occupied by the cellular network. In a 3GPP LTE system, a bandwidth of 1.4 MHz including 6 RBs corresponds to the minimum bandwidth. Upon transmitting an RS of the cellular network, the AP may also transmit a synchronization signal so that the UE measuring the RS can more smoothly obtain time synchronization. In the 3GPP LTE system, the UE may acquire time synchronization using a primary synchronization signal (PSS) and a secondary synchronization signal (SSS). The AP may transmit the PSS and the SSS together with CRSs.

5.4. RS Transmission Measurement Duration

Meanwhile, since an AP of a WLAN system opportunistically occupies a channel based on carrier sensing, it is difficult to completely perform periodic RS transmission even when perfect in-synchronization has been performed.

For example, if a neighboring STA occupies a channel at an RS transmission timing of the AP, the AP cannot transmit an RS at the timing. This problem can be solved through the following methods.

(1) RS Transmission Scheme Through Channel Pre-Occupation of AP

If it is almost time to transmit the RS, the AP may transmit a reservation signal on an idle channel so that other STAs do not occupy the channel and then the AP may transmit the RS at a next scheduled transmission timing.

(2) Scheme Considering an RS Transmission Timing Error of AP at UE

The UE may blindly detect an RS within the range of permitting an error of an RS transmission timing after recognizing that the WLAN AP cannot accurately transmit the RS at a determined timing. To this end, the cellular network may transmit information about a maximum permissible error of the RS transmission timing to the UE. If the RS is not detected before a maximum permissible error timing, the UE may give up detection of the RS and stop measuring the WLAN AP in order to reduce battery consumption.

Figure 16:
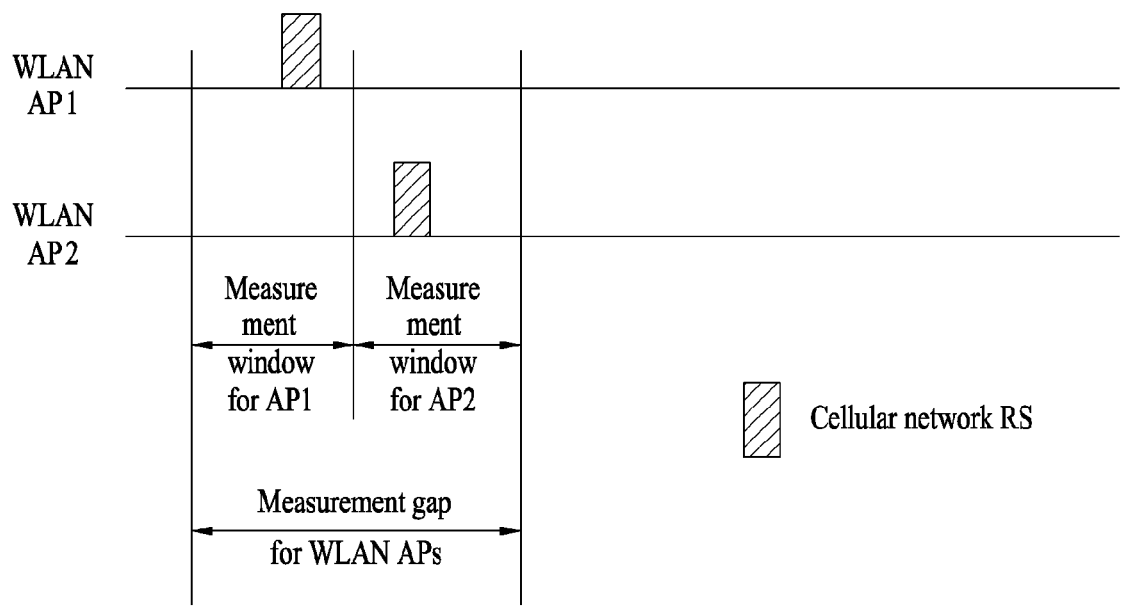
FIG. 16 illustrates measurement durations according to a plurality of APs in accordance with an embodiment of the present invention.

FIG. 16 illustrates measurement durations according to a plurality of APs in accordance with an embodiment of the present invention.

Referring to FIG. 16, a margin of a transmission timing error may be expressed in the form of a time window for measurement of a specific AP. Additionally, for more accurate mobility management, a UE that has failed to detect the specific AP may report information about failure of detection of the AP to the cellular network.

While the UE measures the WLAN, the operation of the cellular network may be restricted such that data cannot be transmitted/received. To minimize these restrictions, when the UE measures a plurality of WLAN APs, timings at which the APs are measured (e.g. timings at which the APs transmit RSs of the cellular network) are favorably contiguous. Meanwhile, if measurement signals of the APs overlap, the measurement operation of the UE may not be correct. Accordingly, it is desirable that the measurement signals of the APs occupy different timings within a given time window as illustrated in FIG. 16. For this, a cellular BS and a WLAN AP may exchange information about measurement signal transmission timings. As an example, the cellular BS the and WLAN AP may exchange time information such as a measurement signal transmission period or offset, information about a measurement window within which measurement is to be performed by the UE, and information about a measurement gap of the UE.

5.5. Additional Information Reporting of UE

The UE that has measured an RS of a WLAN through the above-described process reports a measurement metric to the cellular BS. This measurement metric may be the same as a measurement metric of a legacy cellular system, such as the aforementioned RSRP or RSRQ. A network may additionally report the following information in order to effectively select a proper one of the cellular network and the WLAN.

(1) Statistics of Channel Busy Time

The UE may report statistics for carrier busy durations in each WLAN channel. For example, the statistics of the busy time durations are an average value of channel busy (or idle) times during a given measurement window. As another example, the statistics of the busy time durations are a probability that individual time slots are busy (or idle) after a given measurement window is divided into a plurality of time slots and/or an average value of times during which a state of a busy channel is maintained once the channel becomes busy. Based on such information, a network may discern whether a current UE can access the WLAN channel with an arbitrary probability and determine whether to access the WLAN according to the access probability.

(2) Estimated Number of Contention STAs

The UE may estimate and report the number of contention STAs for channel access in each WLAN channel. One method for performing estimation is to count the number of WLAN preambles detected during a prescribed measurement window. If the UE can read IDs of transmission STAs present in the WLAN preambles, the UE can more accurately discern the number of contention STAs.

(3) Expected Throughput

The UE may virtually attempt channel access in each WLAN channel and report an estimate of throughput that can be obtained as a result of contention. Additionally, the UE may report information about an average or standard deviation of backoff times consumed for virtual channel access, that is, an average or standard deviation of times consumed to succeed in performing actual access after access is attempted. The UE causes the network to estimate service quality that can be obtained when the UE accesses the WLAN channel.

(4) Recommendation for Best Network Selection

The UE may recommend a preferred WLAN channel to a network based on the above-described measurement. In addition, the UE may recommend a channel having better quality to the network by comparing the state of a WLAN channel with that of a cellular network channel. To facilitate such comparison, the network may inform the UE of which comparison metric is to be used. To connect the UE to a proper network according to a load state of the network, a selection bias may be assigned a comparison metric. For example, if expected throughput is used as the comparison metric, expected throughput values of the cellular network and the WLAN are multiplied by weight factors a and b and a network having larger weighted metric is reported.

The above-described metric may be periodically reported and may be aperiodically reported when a network triggers reporting. Alternatively, when a specific event occurs during measurement, the UE may report the metric. For example, if a channel busy time increases to a predetermined level or more or decreases to a predetermined level or less, the UE may report a measurement metric of an associated WLAN channel.

6. Overview of Device to which the Present Invention is Applicable

Figure 17:
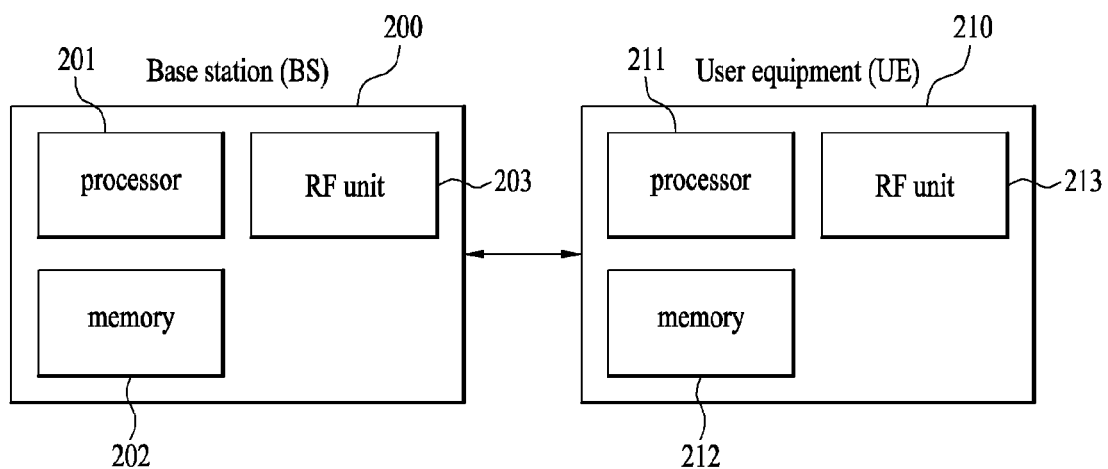
FIG. 17 is a block diagram of a wireless communication device in accordance with an embodiment of the present invention.

FIG. 17 is a block diagram of a wireless communication device in accordance with an embodiment of the present invention.

Referring to FIG. 17, a wireless communication system includes a BS 200 and a plurality of UEs 210 located in the area of the BS 200.

The BS 200 includes a processor 201, a memory 202, and a radio frequency (RF) unit 203. The processor 201 carries out proposed functions, processes, and/or methods. Layers of a radio interface protocol may be achieved by the processor 201. The memory 202 is connected to the processor 201 and stores a variety of information for driving the processor 201. The RF unit 203 is connected to the processor 201 and transmits and/or receives a radio signal.

The UE 210 includes a processor 211, a memory 212, and an RF unit 213. The processor 211 carries out proposed functions, processes, and/or methods. Layers of a radio interface protocol may be achieved by the processor 211. The memory 212 is connected to the processor 211 and stores a variety of information for driving the processor 211. The RF unit 213 is connected to the processor 211 and transmits and/or receives a radio signal.

The memories 202 and 212 may be located at the interior or exterior of the processor 201 and 211, respectively, and may be connected to the processors 201 and 211, respectively, by a well-known means. The BS and/or the UE 210 may include a single antenna or multiple antennas.

The embodiments described hereinabove are combinations of elements and features of the present invention in prescribed forms. The elements or features may be considered selective unless otherwise mentioned. Each element or feature may be practiced without being combined with other elements or features. In addition, some elements and/or features may be combined with one another to constitute the embodiments of the present invention. Operation orders described in embodiments of the present invention may be rearranged. Some elements or features of one embodiment may be included in another embodiment or may be replaced with corresponding elements or features of another embodiment. Claims which are not explicitly dependent on each other may be combined to provide the embodiments or new claims may be added through amendment after this application is filed.

The above-described embodiments of the present invention may be achieved by various means, for example, hardware, firmware, software, or a combination thereof. In a hardware configuration, the methods according to the embodiments of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, the method according to the embodiments of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

While the above-described data transmission/reception method of the present invention in a wireless access system has been described as an example applied to the 3GPP LTE system, the method is applicable to various wireless access systems as well as the 3GPP LTE system.

The invention claimed is:

1. A method for performing measurement and reporting for access to a second base station by a user equipment based on a first base station in a wireless access system, the method comprising:
receiving information on the second base station from the first base station;
measuring the second base station using the information on the second base station; and
reporting measurement information for the second base station to the first base station,
wherein the measuring is performed based on a reference signal transmitted by the second base station, and
wherein the reference signal transmitted by the second base station corresponds to a reference signal of the first base station, and the first base station and the second base station are heterogeneous networks.

2. The method according to claim 1, wherein the first base station is a cellular network base station and the second base station is an access point (AP).

3. The method according to claim 1, wherein the information on the second base station includes at least one of channel information, a list of at least one access point (AP), a cell identity, a number of antenna ports, a transmission pattern of the reference signal transmitted by the second base station, transmission bandwidth of the reference signal transmitted by the second base station, transmission timing information of a beacon signal, and transmission period and offset information.

4. The method according to claim 3, wherein the transmission period and offset information of the reference signal transmitted by the second base station is exchanged between the first base station and the second base station through a backhaul link.

5. The method according to claim 1, further comprising:
receiving a cell-specific reference signal (CRS) pattern from the second base station, wherein an orthogonal frequency division multiplexing (OFDM) symbol on which a CRS is not transmitted is omitted in the CRS pattern.

6. The method according to claim 1, further comprising:
receiving measurement window information of a transmission timing of the reference signal from the first base station to adjust time synchronization between the first base station and the second base station; and
performing measurement for the second base station according to the adjusted synchronization.

7. The method according to claim 1, further comprising:
transmitting, to the first base station, at least one of statistics of a channel state of the second base station, the number of contention stations, estimated throughput information, and channel recommendation information.

8. A method for receiving measurement information for a second base station by a first base station in a wireless access system, the method comprising:
transmitting activated information on the second base station to a user equipment based on the first base station in consideration of a location of the user equipment based on the first base station; and receiving measurement information for the second base station measured by the user equipment based on the first base station, using the information on the second base station, wherein the measurement information for the second base station is obtained based on a reference signal transmitted by the second base station, and wherein the reference signal transmitted by the second base station corresponds to a reference signal of the first base station, and the first base station and the second base station are heterogeneous networks.

9. The method according to claim 8, wherein the first base station is a cellular network base station and the second base station is an access point (AP).

10. The method according to claim 8, wherein the information on the second base station includes at least one of channel information, a list of at least one access point (AP), a cell identity, the number of antenna ports, a transmission pattern of the reference signal transmitted by the second base station, transmission bandwidth of the reference signal transmitted by the second base station, transmission timing information of a beacon signal, and transmission period and offset information.

11. The method according to claim 10, wherein the transmission period and offset information of the reference signal transmitted by the second base station is exchanged with the second base station through a backhaul link.

12. The method according to claim 8, further comprising:
receiving a cell-specific reference signal (CRS) pattern from the user equipment based on the first base station, wherein an orthogonal frequency division multiplexing (OFDM) symbol on which a CRS is not transmitted is omitted in the CRS pattern.

13. The method according to claim 8, further comprising:
transmitting measurement window information of a transmission timing of the reference signal to the user equipment based on the first base station to adjust time synchronization between the first base station and the second base station; and
performing measurement for the second base station according to the adjusted synchronization.

14. The method according to claim 8, further comprising:
receiving, from the user equipment based on the first base station, at least one of statistics of a channel state of the second base station, the number of contention stations, estimated throughput information, and channel recommendation information.

15. A user equipment based on a first base station, for performing measurement for access to a second base station in a wireless access system, the user equipment comprising:
a transmitter;
a receiver; and
a processor configured to:
control the transmitter and the receiver,
control the receiver to receive information on the second base station from the first base station,
measure the second base station using the information on the second base station, and
control the transmitter to report measurement information for the second base station to the first base station, and
wherein the measurement for the second base station is performed based on a reference signal transmitted by the second base station, and
wherein the reference signal transmitted by the second base station corresponds to a reference signal of the first base station, and the first base station and the second base station are heterogeneous networks.

16. A first base station for receiving measurement information for a second base station in a wireless access system, the first base station comprising:
a transmitter;
a receiver; and
a processor configured to:
control the transmitter and the receiver,
control the transmitter to transmit activated information on the second base station to a user equipment based on the first base station in consideration of a location of the user equipment based on the first base station, and
control the receiver to receive measurement information for the second base station measured by the user equipment based on the first base station, using the information on the second base station,
wherein the measurement information for the second base station is obtained based on a reference signal transmitted by the second base station, and
wherein the reference signal transmitted by the second base station corresponds to a reference signal of the first base station, and the first base station and the second base station are heterogeneous networks.

* * * * *